United States Patent
Corson et al.

(10) Patent No.: US 6,667,957 B1
(45) Date of Patent: Dec. 23, 2003

(54) ADAPTIVE ROUTING METHOD FOR A DYNAMIC NETWORK

(75) Inventors: Mathew Scott Corson, Kensington, MD (US); Vincent Douglas Park, Bowie, MD (US)

(73) Assignees: University of Maryland, College Park, MD (US); The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/266,868

(22) Filed: Mar. 12, 1999

Related U.S. Application Data

(60) Provisional application No. 60/078,023, filed on Mar. 14, 1998.

(51) Int. Cl.[7] .............................................. G08C 15/00
(52) U.S. Cl. ........................ 370/238; 370/254; 370/400
(58) Field of Search ................................ 370/237, 238, 370/254, 255, 256, 351, 400, 389, 392; 709/238, 239, 240, 241, 242, 243

(56) References Cited

U.S. PATENT DOCUMENTS

| | | | | |
|---|---|---|---|---|
| 4,905,233 A | * | 2/1990 | Cain et al. ................... | 370/400 |
| 5,088,032 A | * | 2/1992 | Bosack ........................ | 370/401 |
| 5,138,615 A | * | 8/1992 | Lamport et al. ............. | 370/400 |
| 5,412,654 A | * | 5/1995 | Perkins ........................ | 370/349 |

OTHER PUBLICATIONS

M.S. Corson, S. Batsell and J. Macker, Architectural considerations for mobile mesh networking, working draft, May 1996, available at http://tonnant.itd.nrl.navy.mil/mmnet/mmnetRFC.txt.*

V.D. Park, M.S. Corson, A Highly Adaptive Distributed Routing Algorithm for Mobile Wireless Networks, Apr. 1997, Proceeding INFOCOM '97.*

* cited by examiner

*Primary Examiner*—Chi Pham
*Assistant Examiner*—Keith M. George
(74) *Attorney, Agent, or Firm*—Squire, Sanders & Dempsey L.L.P.

(57) ABSTRACT

A routing system and method utilizes a highly-adaptive, loop-free, distributed routing algorithm for dynamic networks. The basic, underlying method is neither a distance-vector nor a link-state method; the invention employs an algorithm which is one of a family of algorithms which are called "link reversal" algorithms. The protocol's reaction is structured as a sequence of diffusing computations, each computation consisting of a sequence of directed link reversals. This behavior is achieved, in part, through the use of a "physical or logical clock" to establish the temporal order of topological change events. A key concept in the protocol's design; is an attempt to decouple (to the greatest extent possible) the generation of far-reaching control message propagation from the dynamics of the network topology. These design characteristics make the protocol highly-adaptive, efficient and scalable-being best-suited for use in large, dynamic, bandwidth-constrained networks. In such networks, the protocol's reaction to link failures typically involves only a single pass of the distributed algorithm. The results of a simulation study indicate that for a given available bandwidth, as either the size of the network or the rate of topological changes increases, the performance the invention eventually exceeds that of ILS.

21 Claims, 17 Drawing Sheets

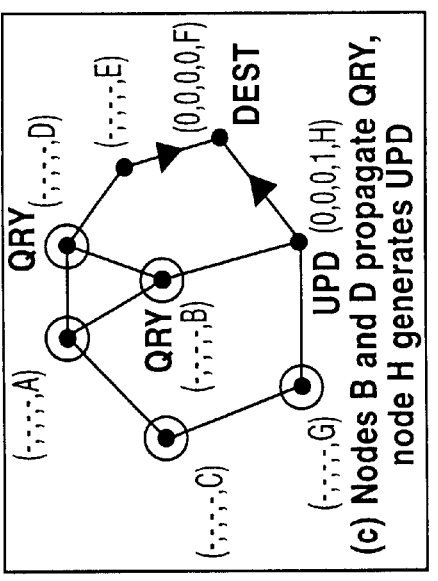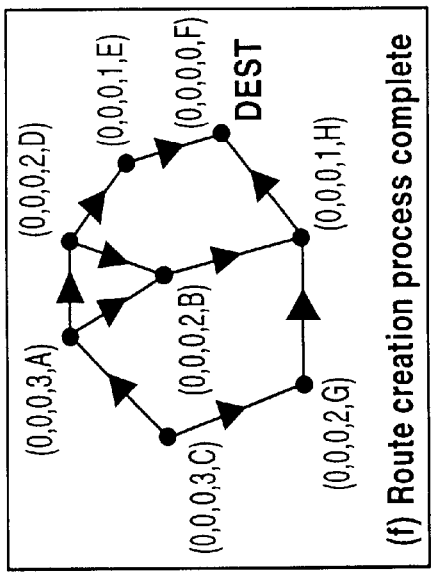
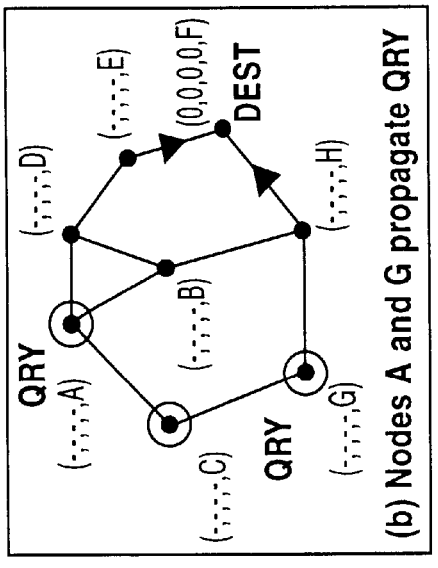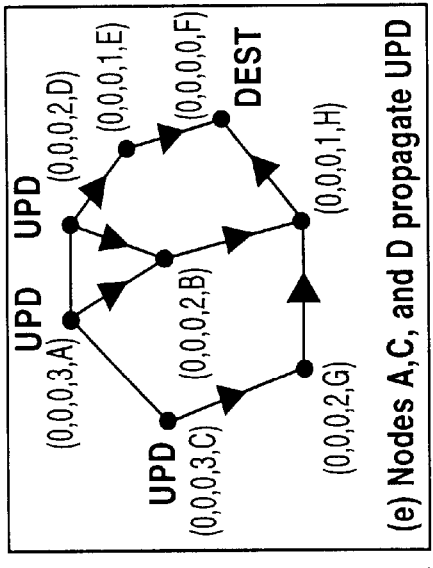
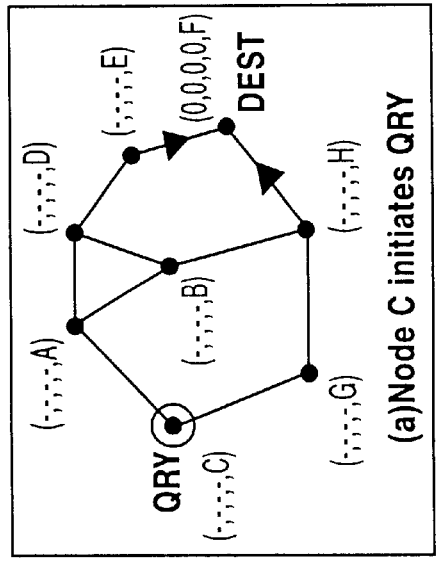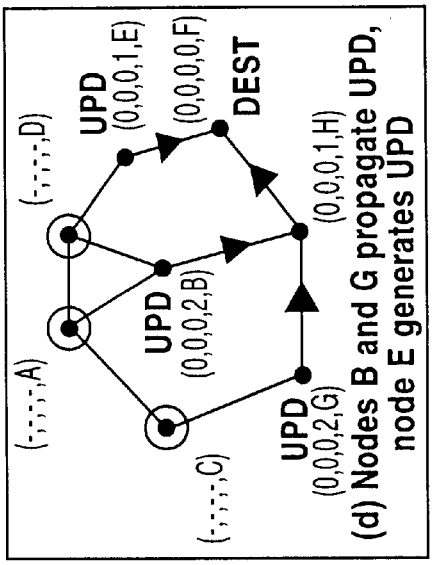

(a) Link (D,E) fails (b) No reaction necessary, all nodes still have downstream links

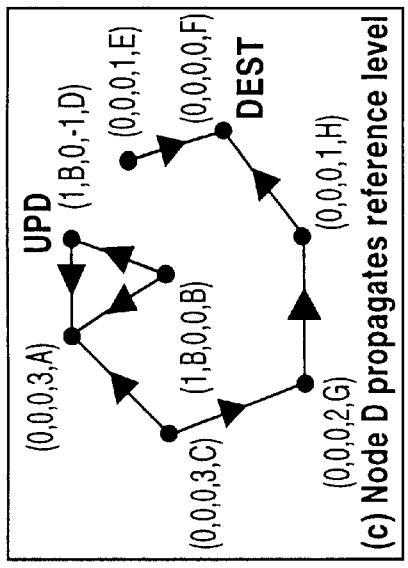
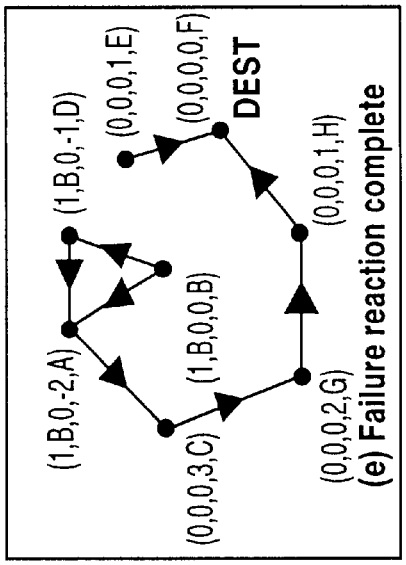
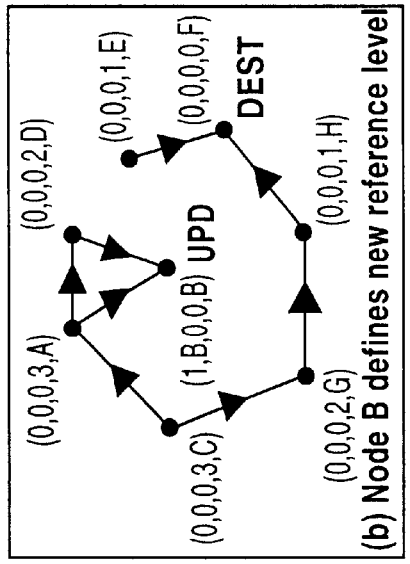
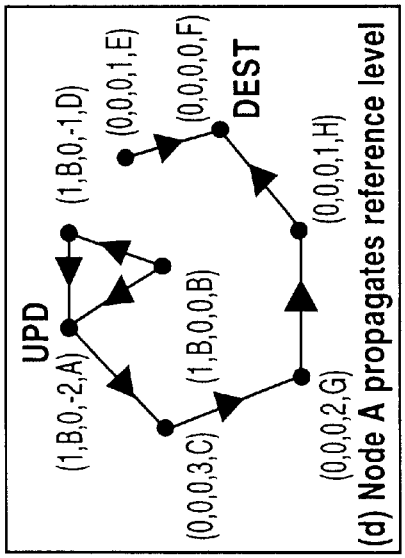
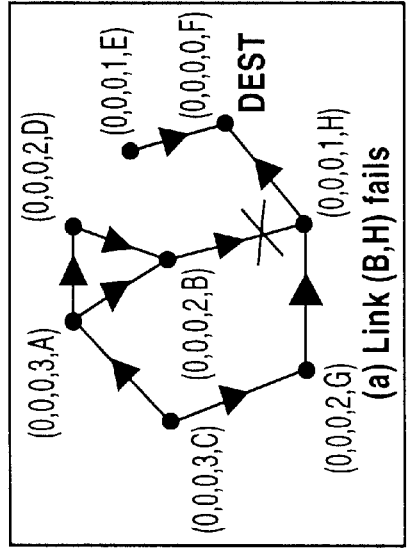

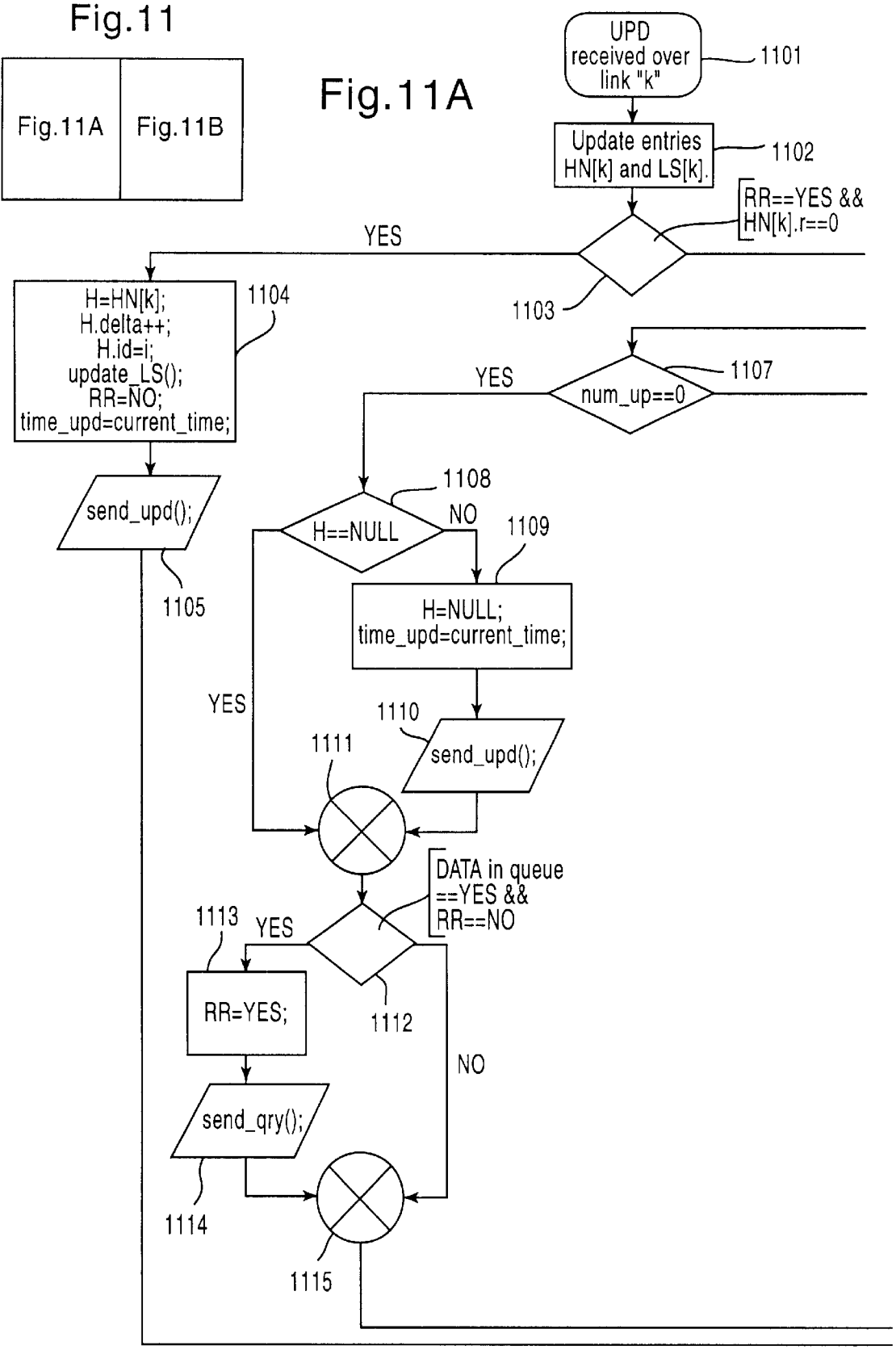

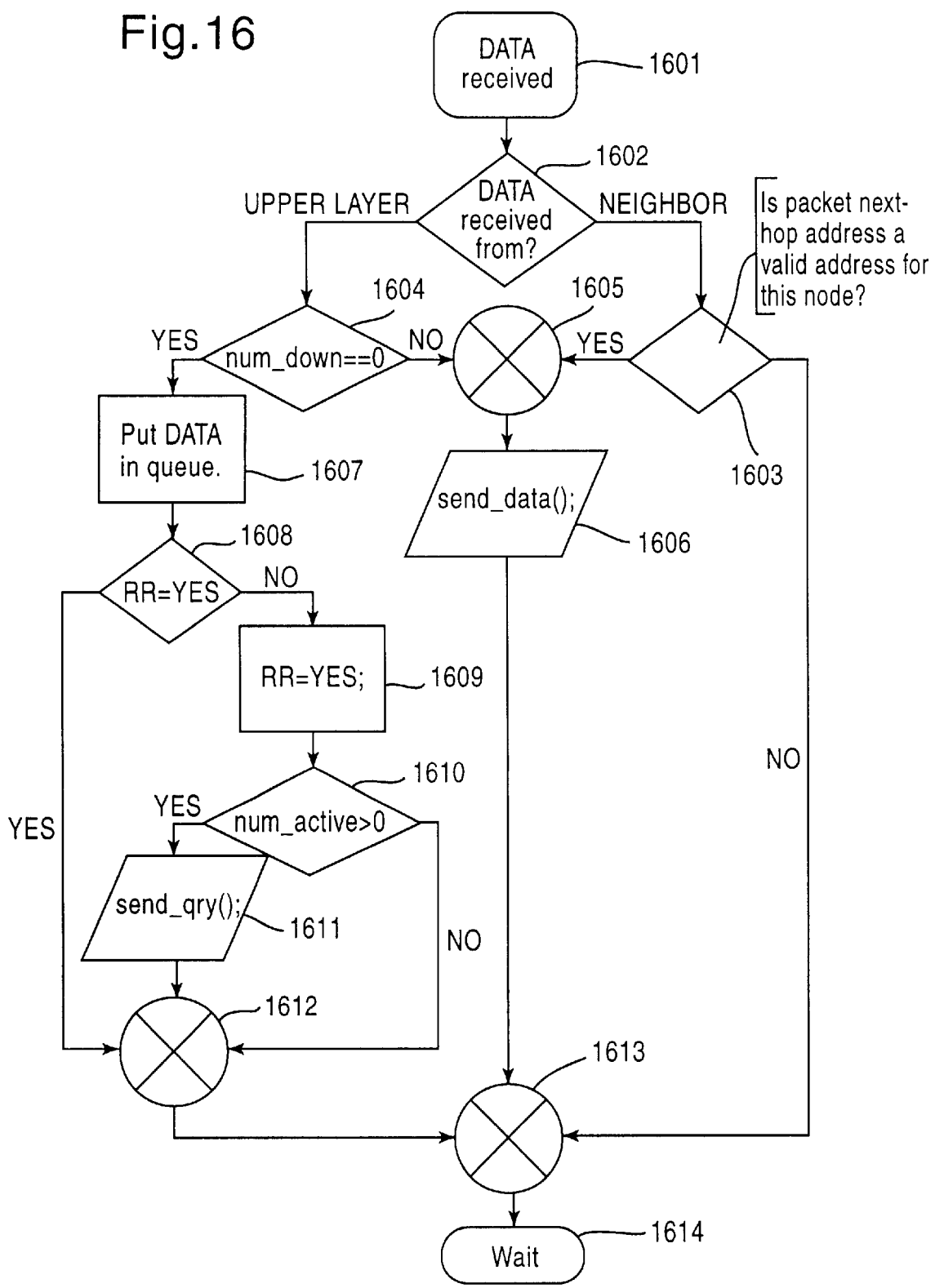

ADAPTIVE ROUTING METHOD FOR A DYNAMIC NETWORK

This application claims priority of U.S. provisional patent application Ser. No. 60/078,023, filed on Mar. 14, 1998.

BACKGROUND OF THE INVENTION

1. Field of the Invention

The present invention is directed to a highly-adaptive, loop-free, distributed routing algorithm for dynamic networks. The invention utilizes one of a family of algorithms which is known as a "link reversal" algorithm. The invention structures reactions as a temporally-ordered sequence of diffusing computations, with each computation including a sequence of directed link reversals. The invention is well suited for use in large, dynamic, bandwidth-constrained networks. In such networks, rapid route maintenance with a minimum of communication overhead provides higher performance.

2. Description of the Related Art

Traditionally, practical datagram routing algorithms are designed for operation in static or quasi-static networks with hardwired links. In such networks bandwidth is relatively abundant, and the protocol design goals involve minimization of router state (to permit scalability) and rapid reaction to topological changes when they occur (to ensure good data routing performance). In other words, limiting protocol storage and time complexity are the primary design goals.

Distance-vector routing algorithms based on the distributed Bellmann-Ford (BF) computation, such as the Routing Information Protocol (RIP) were among the earliest approaches. However, these approaches suffered from the well-known "counting-to-infinity" problem that affected the time complexity (i.e., convergence times) of these protocols. There has been a large amount of theoretical and practical work seeking to remedy this problem and improve the performance of distance-vector approaches. The development of link-state routing algorithms provided an alternative approach, in which the entire network topology is distributed to all nodes, allowing each router to independently compute paths to every destination. However, nearly all of this work continued in the direction started by the BF work and focused on the problem of "shortest-path" routing. Shortest path routing techniques seek to route traffic over the "least cost" path to the destination (often times the shortest path measured in hop count), an approach that optimal routing theory indicates is favorable during periods of light traffic. One aspect inherent in this work is that supporting a shortest-path computation requires a certain amount of communication complexity within the routing protocol. This, in turn, requires that sufficient bandwidth be available in the network to enable the computation while still leaving enough bandwidth for actual data routing.

The invention considers the problem of routing in a dynamic network. An example of such a network is a mobile, multihop, wireless network which can be envisioned as a collection of routers (equipped with wireless receiver/transmitters) that are free to move about arbitrarily. The status of the communication links between the routers, at any given time, is a function of their positions, transmission power levels, antenna patterns, co-channel interference levels, and other time-varying factors. Thus, the mobility of the routers and variability of other connectivity factors result in a network with a potentially rapidly and unpredictably changing topology. Congested links are also an expected characteristic of such a network, as wireless links inherently have significantly lower capacity than their hardwired counterparts and are therefore more prone to congestion. The highly dynamic and bandwidth-constrained nature of mobile networks most dramatically alters the trade-offs to be made in protocol design. Thus, it is communication complexity, not storage complexity, that is the greater determinant of protocol scalability in these networks. The combination of network size, topology dynamics and available bandwidth determines when approaches that do not perform shortest-path routing may be more desirable.

SUMMARY OF THE INVENTION

A routing algorithm which is well-suited for operation in a relatively dynamic or bandwidth-constrained networking environment, for example a mobile wireless networking environment, should therefore possess the following attributes:

Executes distributedly

Provides loop-free routes

Provides multiple routes (to alleviate congestion)

Establishes routes quickly (so they may be used before the topology changes)

Minimizes communication overhead by localizing algorithmic reaction to topological changes when possible (to conserve available bandwidth and increase scalability)

Based on these attributes, the inventors have developed a method referred to as the Temporally Ordered Routing Algorithm (TORA) which is a new routing method that is tailored for operation in a highly-dynamic networking environment, such as a mobile network. TORA's design is based largely on the notion that high reactivity (i.e., low time complexity) and bandwidth conservation (i.e., low communication complexity) are of greater importance than routing optimality (i.e., determination of the shortest-path). A key concept in its design is an attempt to decouple (to the greatest extent possible) the generation of potentially far-reaching control message propagation from the dynamics of the network topology. The "scope" of control messaging following topological changes is typically localized to a very small set of nodes near the change without having to resort to a dynamic, hierarchical routing solution with its attendant complexity. A possible enhancement to the protocol (to be discussed later) would be to imbed farther-reaching control message propagation into the protocol as a secondary mechanism. This propagation would occur periodically at a very low rate, independent of the network topology dynamics, and would be employed as a means of infrequent route optimization and soft-state route verification.

TORA is distributed, in that nodes need only maintain information about adjacent nodes (i.e., one-hop knowledge). Like a distance-vector routing algorithm, TORA maintains state on a per-destination basis. This property is exploited in the design by establishing routing for each given destination on-demand, since it may not be necessary (nor desirable) to maintain routes between every source/destination pair at all times. The overhead expended to establish a route between a given source/destination pair will be wasted if the source does not require the route prior to its invalidation due to topological changes. Thus, TORA is "source initiated" and creates a set of routes to a given destination only when there is message traffic for that destination. It guarantees all routes are loop-free, and typically provides multiple routes for any source/destination pair that requires a route. Since having a single route is sufficient, many topological changes require no algorithmic reaction. Following topological changes that do require reaction, the protocol quickly re-establishes valid routes. This ability to initiate and react infrequently serves to further minimize communication overhead. Finally, in the event of a network partition, the protocol detects the partition and erases all invalid routes. While not described here, TORA may be easily modified to run in a traditional proactive, "destination-initiated" mode where all nodes actively maintain routing to a given destination (presumably a "frequent destination" for many nodes), thereby removing the need for source-initiated, on-demand route creation.

BRIEF DESCRIPTION OF THE DRAWINGS

FIGS. 2(a)–2(f) illustrate an example of creating routes according to the invention;

FIGS. 5(a)–5(e) illustrate an example of maintaining routes following a link failure which does require a reaction;

FIGS. 7–16 are flow charts illustrating an implementation of a protocol of the temporally ordered routing algorithm according to the invention.

DETAILED DESCRIPTION OF THE PREFERRED EMBODIMENTS

Figure 1:
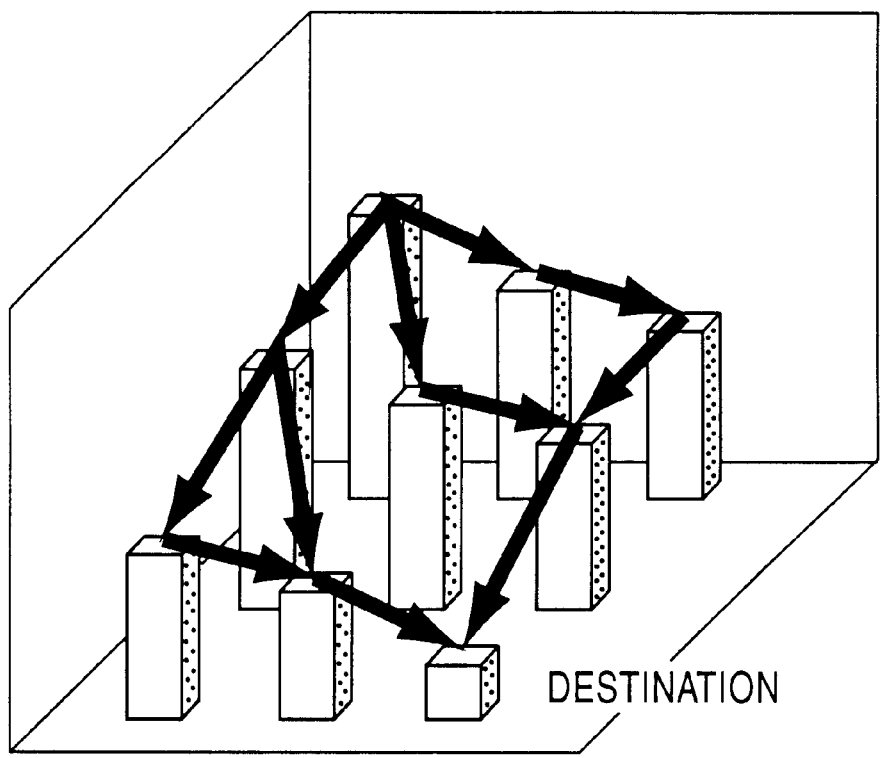
FIG. 1 is a conceptual illustration of a directed acyclic graph formed by routers having relative heights according to the invention.

A logically separate version of the invention is run for each destination to which routing is required. For simplicity and ease of understanding, the following discussion focuses on a single version running for a given destination, in a network such as a mobile network. The protocol can be separated into three basic functions: creating routes, maintaining routes, and erasing routes. During route creation and maintenance, nodes use a metric (which can be thought of as a "height") to establish a directed acyclic graph (DAG) rooted only at the destination (FIG. 1). Links are assigned a direction ("upstream" or "downstream") based on the relative heights of neighboring nodes, i.e., they are directed from higher to lower. The significance of the heights and the link directional assignments is that a node may only route information (i.e., forward message packets) downstream (i.e., to a lower neighboring node). Links to neighboring nodes with an unknown or "null" height are considered undirected and cannot be used for routing. Thus, the creating routes process essentially corresponds to the selection of node heights to form a directed sequence of links leading to the destination in a previously undirected network or portion of the network. Following a topological change (e.g., the loss of some node's last downstream link), some directed paths may no longer lead to the destination (i.e., the DAG may no longer be rooted only at the destination). The maintaining routes process proceeds as a sequence of directed link reversals (caused by a re-selection of node heights) which re-orients the DAG such that all directed paths again lead to the destination. Two algorithms, which are members of a general class of algorithms designed to accomplish this task, are presented in E. Gafni and D. Bertsekas, DISTRIBUTED ALGORITHMS FOR GENERATING LOOP-FREE ROUTES IN NETWORKS WITH FREQUENTLY CHANGING TOPOLOGY, IEEE Trans. Commun. (January 1981) (the contents of this paper are hereby incorporated by reference). However, these algorithms are designed for operation in non-partitioned networks. Due to the undesirable behavior exhibited by these algorithms in portions of the network that become partitioned from the destination, they are deemed unacceptable for practical use. The method of the present invention incorporates an algorithm in the same general class, which is more efficient in reacting to topological changes and capable of detecting a network partition. This leads to the third function, erasing routes. Route erasure is initiated when a node perceives that it has detected a network partition. During this process, nodes set their heights to null and their adjacent links become undirected.

The protocol accomplishes these three functions through the use of three distinct control packets: query (QRY), update (UPD), and clear (CLR). QRY packets are used for creating routes, UPD packets are used for both creating and maintaining routes, and CLR packets are used for erasing routes.

A network can be modeled as a graph G=(N, L), where N is a finite set of nodes and L is a set of initially undirected links. Each node i∈N is assumed to have a unique node identifier (ID), and each link (i, j)∈L is assumed to allow two-way communication (i.e., nodes connected by a link can communicate with each other in either direction). The set of links L is changing with time (i.e., new links can be established and existing links can be severed). From the perspective of neighboring nodes, a node failure is equivalent to severing all links incident to that node. Each initially undirected link (i, j)∈L may subsequently be assigned one of three states; (1) undirected, (2) directed from node i to node j, or (3) directed from node j to node i. If a link (i, j)∈L is directed from node i to node j, node i is said to be "upstream" from node j while node j is said to be "downstream" from node i. For each node i, the "neighbors" of i, $N_i \subset N$, is defined to be the set of nodes j such that (i, j)∈L. For the subsequent discussion, a lower-level protocol, which ensures that each node i is always aware of its neighbors in the set $N_i$, is assumed to exist. It is also assumed that all control packets are sent to all neighbors in the set $N_i$ and are received correctly within a finite time and in order of transmission.

At any given time, an ordered quintuple $H_i=(\tau_i, oid_i, r_i, \delta_i, i)$ is associated with each node i∈N. Conceptually, the quintuple associated with each node represents the height of the node as defined by two parameters: a reference level, and a delta with respect to the reference level. The reference level is represented by the first three values in the quintuple, while the delta is represented by the last two values. A new reference level is defined each time a node loses its last downstream link due to a link failure. The first value representing the reference level, $\tau_i$, is a time tag set to the "time" of the link failure. It is assumed that all nodes have synchronized clocks. This could be accomplished via interface with an external time source such as the Global Positioning System (GPS) or through use of an algorithm such as the Network Time Protocol. In practice, this time tag need not actually indicate or be "time," so long as it correctly establishes the temporal order of link failure in the network to within the precision of the time tag value. The second value, $oid_i$, is the originator-ID (i.e., the unique ID of the node which defined the new reference level). This ensures that the reference levels can be totally ordered lexicographically, even if multiple nodes define reference levels due to failures which occur simultaneously (i.e., with equal time tags). The third value, $r_i$, is a single bit used to divide each of the unique reference levels into two unique sub-levels. This bit is used to distinguish between the "original" reference level and its corresponding, higher "reflected" reference level. When a distinction is not required, both original and reflected reference levels will simply be referred to as "reference levels." The first value representing the delta, $\delta_i$, is an integer used to order nodes with respect to a common reference level. This value is instrumental in the propagation of a reference level. How $\delta_i$ is selected will be clarified in a subsequent section. Finally, the second value representing the delta, i, is the unique ID of the node itself. This ensures that nodes with a common reference level and equal values of $\delta_i$ (and in fact all nodes) can be totally ordered lexicographically at all times.

Each node i (other than the destination) maintains its height, $H_i$. Initially the height of each node in the network (other than the destination) is set to NULL, $H_i=(-, -, -, -, i)$. Subsequently, the height of each node i can be modified in accordance with the rules of the protocol. The height of the destination is always ZERO, $H_{did}=(0, 0, 0, 0, did)$, where did is the destination-ID (i.e., the unique ID of the destination for which the algorithm is running). In addition to its own height, each node i maintains a height array with an entry $HN_{i,j}$ for each neighbor $j \in N_i$. Initially the height of each neighbor is set to NULL, $HN_{i,j}=(-, -, -, -, j)$. If the destination is a neighbor of i (i.e., did $\in N_i$), node i sets the height entry of the destination to ZERO, $HN_{i,did}=(0, 0, 0, 0, did)$.

Each node i (other than the destination) also maintains a link-state array with an entry $LS_{i,j}$ for each link (i, j)$\in L$, where $j \in N_i$. The state of the links is determined by the heights $H_i$ and $HN_{i,j}$ and is directed from the higher node to the lower node. If a neighbor j is higher than node i, the link is marked upstream (UP). If a neighbor j is lower than node i, the link is marked downstream (DN). If the neighbor's height entry, $HN_{i,j}$, is NULL, the link is marked undirected (UN). Finally, if the height of node i is NULL, then any neighbor's height which is not NULL is considered lower, and the corresponding link is marked downstream (DN). When a new link (i, j)$\in L$ is established (i.e., node i has a new neighbor $j \in N_i$), node i adds entries for the new neighbor to the height and link-state arrays. If the new neighbor is the destination, the height entry is set to ZERO, $HN_{i,did}=(0, 0, 0, 0, did)$; otherwise it is set to NULL, $HN_{i,j}=(-, -, -, -, j)$. The corresponding link-state, $LS_{i,j}$, is set as outlined above. Nodes need not communicate any routing information (e.g., exchange heights) upon link activation.

Creating routes requires use of the QRY and UPD packets. A QRY packet consists of a destination-ID (did), which identifies the destination for which the algorithm is running. An UPD packet consists of a did, and the height of the node i that is broadcasting the packet, $H_i$.

Each node i (other than the destination) maintains a route-required flag, $RR_i$, which is initially unset. Each node i (other than the destination) also maintains the time at which the last UPD packet was broadcast, and the time at which each link (i, j)$\in L$, where $j \in N_i$, became active.

When a node with no directed links and an unset route-required flag requires a route to the destination (i.e., has message traffic for the destination)-it broadcasts a QRY packet and sets its route-required flag.

When a node i receives a QRY packet, it reacts as follows:

(a) If the route-required flag of the receiving node is set-it discards the QRY packet.

(b) If the route-required flag of the receiving node is not set and its height is non-NULL with r=0, it first compares the time the last UPD packet was broadcast to the time the link over which the QRY packet was received became active. If an UPD packet has been broadcast since the link became active, it discards the QRY packet; otherwise, it broadcasts an UPD packet that contains its current height.

(c) If the route-required flag of the receiving node is not set and its height is either NULL, or non-NULL with r=1, but it has a neighbor node whose height is non-NULL with r=0, it sets its height to $H_i=(T_j, oid_j, r_j, \delta_j+1, i)$, where $HN_{i,j}=(T_j, oid_j, r_j, \delta_j, j)$ is the minimum height of its non-NULL neighbors with r=0, updates all the entries in its link-state array LS and broadcasts an UPD packet which contains its new height.

(d) If none of the above conditions hold true, the receiving node re-broadcasts the QRY packet and sets its route-required flag.

If a node has the route-required flag set when a new link is established, it broadcasts a QRY packet.

When a node i receives an UPD packet from a neighbor $j \in N_i$, node i first updates the entry $HN_{i,j}$, in its height array with the height contained in the received UPD packet and then reacts as follows:

(a) If the route-required flag of the receiving node is set and the height contained in the received UPD packet is non-NULL with r=0, it sets its height to $H_i=(T_j, oid_j, r_j, \delta_j+1, i)$, where $HN_{i,j}=(T_j, oid_j, r_j, \delta_j, j)$ is the height contained in the received UPD packet, updates all the entries in its link-state array LS, unsets the route-required flag and broadcasts an UPD packet that contains its new height.

(b) If the above condition does not hold true, the receiving node simply updates the entry $LS_{i,j}$ in its link-state array.

The section on maintaining routes discusses the additional reaction that occurs if (b) results in loss of the last downstream link due to a link reversal.

An example of the creating routes process is illustrated in FIGS. 2(a)–2(f). The respective heights are shown adjacent to each node, and the destination for which the algorithm is running is marked DEST. A circle around a node indicates that its route-required flag is set. Recall that the last value in each height is the unique ID of the node, and that lexicographical ordering (where 0<1<2 . . . and A<B<C . . . ) is used to direct links. Note that the height selected for node D in FIG. 2(e) reflects an arbitrary assumption that node D received the UPD packet from node E prior to the packet from node B. Had node D instead selected a height in response to the packet from node B, the direction of link (A, D) in FIG. 2(f) would have been reversed.

Maintaining routes is only performed for nodes that have a height other than NULL. Furthermore, any neighbor's height which is NULL is not used in the computations. A node i is said to have no downstream links if $H_i < HN_{i,j}$ for all non-NULL neighbors $j \in N_i$. This will result in one of five possible reactions depending on the state of the node and the preceding event (e.g., topological change or packet reception). Each node (other than the destination) that has no downstream links modifies its height, $H_i=(T_i, oid_i, r_i, \delta_i, i)$, as follows:

Case 1 (Generate): Node i has no downstream links (due to a link failure).

$(T_i, oid_i, r_i)=(t, i, 0)$, where t is the time of the failure $(\delta_i, i)=(0, i)$ In essence, node i defines a new reference level. The above assumes node i has at least one upstream neighbor. If node i has no upstream neighbors, it simply sets its height to NULL.

Case 2 (Propagate): Node i has no downstream links, and the ordered sets ($\tau_j$, oid$_j$, r$_j$) are not equal for all j∈N$_i$.

$$(\tau_i, oid_i, r_i) = \max\{(\tau_j, oid_j, r_j)|j\in N_j\}$$

$$(\delta_i, i) = \left(\min\left\{\delta_j \middle| \begin{array}{l} j \in N_i \text{ with } (\tau_j, oid_j, r_j) \\ = \max\{(\tau_j, oid_j, r_j)\} \end{array}\right\} - 1, i\right)$$

In essence, node i propagates the reference level of its highest neighbor and selects a height that is lower than all neighbors with that reference level.

Case 3 (Reflect): Node i has no downstream links, and the ordered sets ($\tau_j$, oid$_j$, r$_j$) are equal with r$_j$=0 for all j∈N$_i$.

$$(\tau_i, oid_i, r_i) = (\tau_j, oid_j, 1)$$

$$(\delta_i, i) = (0, i)$$

In essence, the same reference level (which has not been "reflected") has propagated to node i from all of its neighbors. Node i "reflects" back a higher sub-level by setting the bit r.

Case 4 (Detect): Node i has no downstream links, the ordered sets ($\tau_j$, oid$_j$, r$_j$) are equal with r$_j$=1 for all j∈N$_i$, and oid$_j$=i (i.e., node i defined the level).

$$(\tau_i, oid_i, r_i) = (-,-,-)$$

$$(\delta_i, i) = (-,i)$$

In essence, the same reference level (which has been "reflected") has propagated to node i from all of its neighbors, and the reference level was defined by node i. This corresponds to detection of a partition. Node i must initiate the process of erasing invalid routes (which are not rooted at the destination) as discussed later.

Case 5 (Generate): Node i has no downstream links, the ordered sets ($\tau_j$, oid$_j$, r$_j$) are equal with r$_j$=1 for all j∈N$_i$, and oid$_j$≠i (i.e., node i did not define the level).

$$(\tau_i, oid_i, r_i) = (t, i, 0), \text{ where t is the time of the failure}$$

$$(\delta_i, i) = (0, i)$$

In essence, the same reference level (which has been "reflected") has propagated to node i from all of its neighbors, but the reference level was not defined by node i. This is not necessarily an indication of a partition. Node i defines a new reference level.

Figure 3:
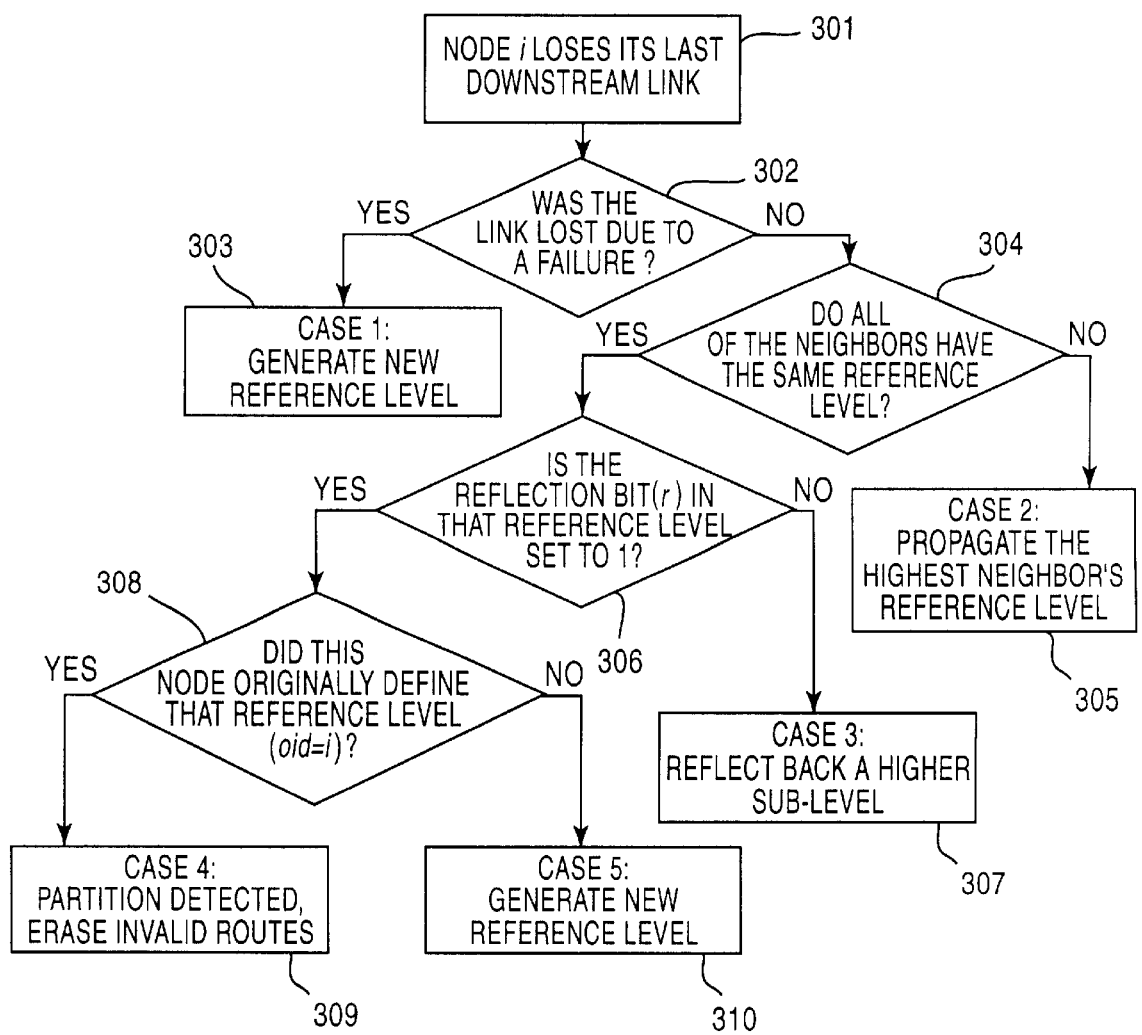
FIG. 3 illustrates a decision tree for maintaining routes according to the invention.

Following determination of its new height in cases 1, 2, 3, and 5, node i updates all the entries in its link-state array LS, and broadcasts an UPD packet to all neighbors j N$_i$. The UPD packet consists of a did, and the new height of the node i which is broadcasting the packet, H$_i$. When a node i receives an UPD packet from a neighbor j N$_i$, node i first reacts as described in the prior description of creating routes. If the initial processing causes a link reversal and node i loses its last downstream link-then it modifies its height as outlined in the cases above. FIG. 3 summarizes these five cases in the form of a decision tree, starting from the time a node loses its last downstream link, in step 301. If the link was lost due to failure, then a new reference level is generated in step 303. If the link was not lost due to failure, it is determined whether the neighbors have the same reference level, in step 304. If they do not have the same reference level, then the highest neighbor's reference level is propagated, in step 305. If they have the same reference level, then it is determined whether the reflection bit in that reference level is set to 1 in step 306. If the reflection bit is not set to 1, then a higher sub-level is reflected back in step 307. If the reflection bit is set to 1, then it is determined whether the node originally defined that reference level, in step 308, with a new reference level being generated, in step 310, when the answer is "no" and with a partition being detected and invalid routes being erased, in step 309, when the answer is "yes". In the event node i loses a link (i, j) L, which is not its last downstream link, node i simply removes the entries HN$_{i,j}$ and LS$_{i,j}$ in its height and link-state arrays.

Figure 4A:
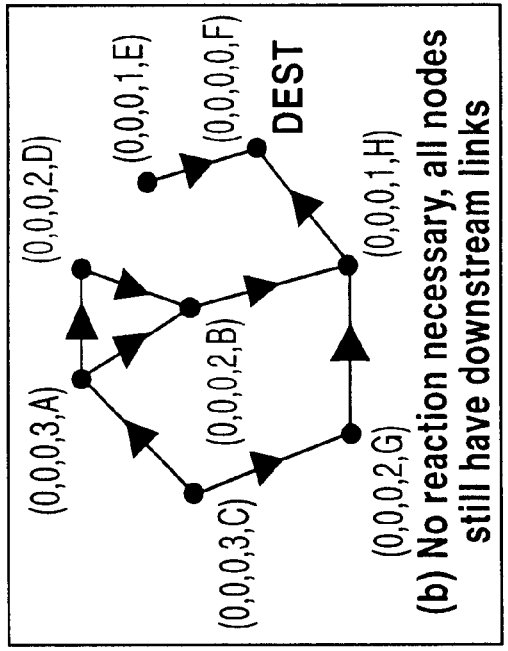
FIGS. 4(a) and 4(b) illustrate an example of a link failure not requiring a reaction.
Figure 4B:
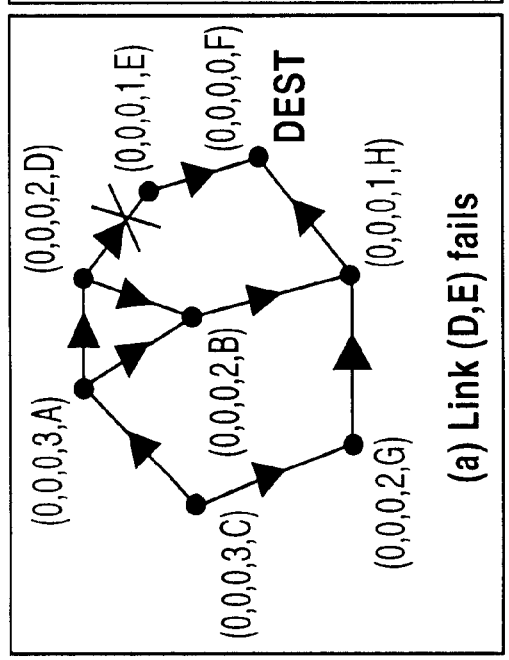
Figure 6C:
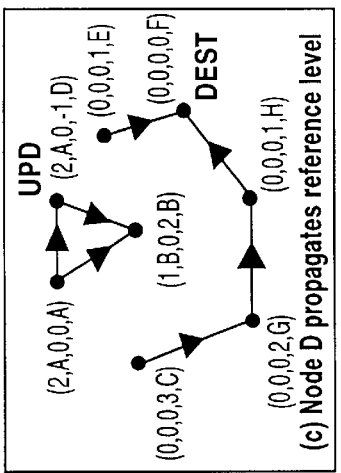
FIGS. 6(a)–6(h) illustrate an example of maintaining and erasing routes according to the invention, following a link failure which partitions the network.
Figure 6F:
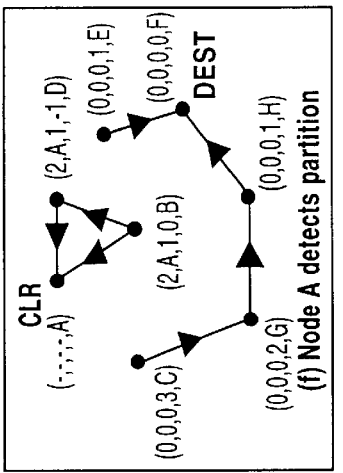
Figure 6B:
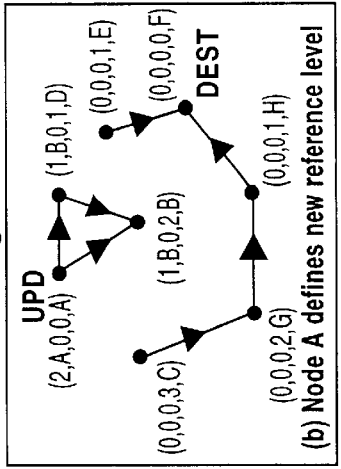
Figure 6E:
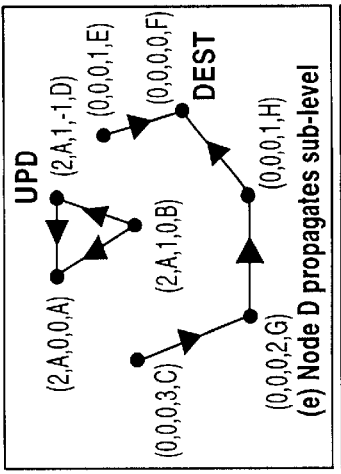
Figure 6H:
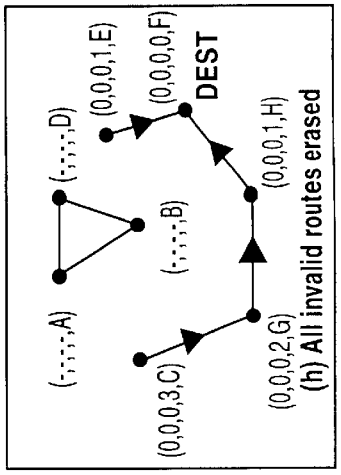
Figure 6A:
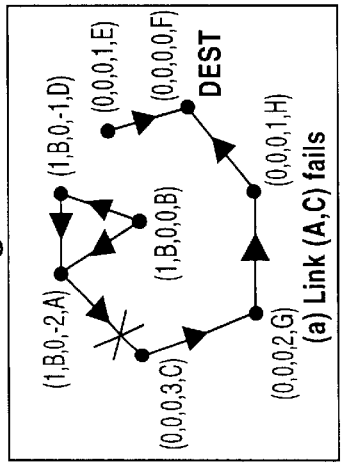
Figure 6D:
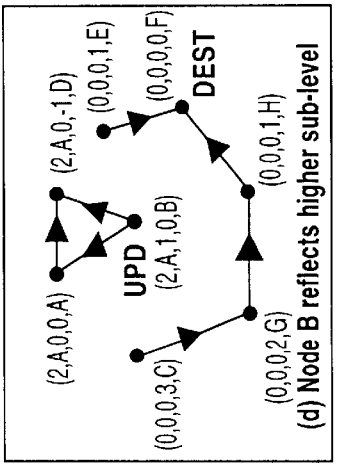
Figure 6G:
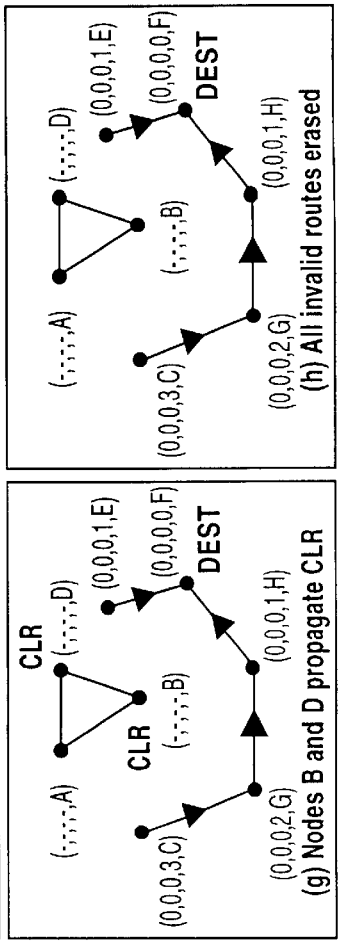

The following examples illustrate the maintaining routes process. FIGS. 4(a) and 4(b) provides an example where no reaction is required. The network is first depicted as at the end of FIGS. 2(a)–2(f), with the addition that link (D, E) is marked as failing. Since all nodes still have downstream links following the failure, no transmissions are required. This is likely to be of greater significance in more densely connected networks. FIGS. 5(a)–5(e) provide an example where a reaction is required. The network is first depicted as in FIG. 4(b), with the addition that link (B, H) is marked as failing. The time of the failure, as depicted in the example, was arbitrarily selected to be "1."

Following detection of a partition (i.e.,case 4), node i sets its height and the height entry for each neighbor j∈N$_i$ to NULL, updates all the entries in its link-state array LS, and broadcasts a CLR packet. The CLR packet consists of a did and the reflected reference level of node i, ($\tau_i$, oid$_i$, 1). When a node i receives a CLR packet from a neighbor j∈N$_i$, it reacts as follows:

(a) If the reference level in the CLR packet matches the reference level of node i, it sets its height and the height entry for each neighbor j∈N$_i$ to NULL (unless the destination is a neighbor, in which case the corresponding height entry is set to ZERO), updates all the entries in its link-state array LS, and broadcasts a CLR packet.

(b) If the reference level in the CLR packet does not match the reference level of node i, it sets the height entry for each neighbor j∈N$_i$ (with the same reference level as the CLR packet) to NULL, and updates the corresponding link-state array entries.

Thus, the height of each node in the portion of the network which was partitioned is set to NULL and all invalid routes are erased. If condition (b) causes node i to lose its last downstream link, it reacts as in case 1 of maintaining routes. FIGS. 6(a)–6(h) provides an example that demonstrates partition detection and erasing of invalid routes. The network is first depicted as at the end of FIGS. 5(a)–5(e), with the addition that link (A, C) is marked as failing. The time of the failure, as depicted in the example, was arbitrarily selected to be "2."

It is possible to define the CLR packet with an additional one-bit field, which shall be referred to as a query flag. When a node would normally broadcast a CLR packet immediately followed by a QRY packet, the node broadcasts a CLR packet with the query flag set. Consequently, reception of a CLR packet with the query flag set is processed as if a CLR packet was received first and then a QRY packet was received.

Loop freedom and convergence within a finite time are generally desirable properties for routing protocols since protocols possessing them tend to perform well. These are generally desirable, but not necessary, conditions for good protocol performance. While the key concept of TORA is the maintaining routes function, a function which is simply a new algorithm in the same general class of known algorithms (and thus inherits the properties of that class), the entire protocol includes other mechanisms which place it outside this class of algorithms. For example, TORA adds the notion of a NULL height, a method for assigning non-NULL heights to previously NULL nodes (creating routes), the ability to detect network partitions, and a method for assigning NULL heights to previously non-NULL nodes (erasing routes). It is therefore necessary to re-address the properties of loop-freedom and convergence. In addition to the earlier stated assumptions regarding packet transmission and reception, it is also assumed that events (e.g., topological changes or packet receptions) are processed by each node in the order in which they occur and that each individual event is processed within a finite time.

Consider any time when the control packets that were created by nodes that modified their heights have been correctly received by all of the neighboring nodes, and any such neighboring nodes have updated their corresponding height and link-state entries. At any such time, no two neighboring nodes can disagree on the direction (i.e., UP versus DN) assigned to a given link (although one neighbor may consider the link assigned, while the other neighbor considers the link unassigned). This does not imply that all reactions have ceased. There may be any number of nodes that must subsequently modify their heights in accordance with the rules of the protocol (due to a link failure or a received control packet) and broadcast additional control packets.

Property: Loop-freedom. The routes defined by the link-state arrays are loop-free at every such instant in time.

Proof: Loop-freedom. This property is almost a direct result of the total ordering of the heights associated with the nodes, and the fact that these heights determine the direction of the links between nodes. The proof is by contradiction. Assume that a loop is formed (node 1 is considered downstream by node 2; node 2 is considered downstream by node 3; . . . ; node (k−1) is considered downstream by node k; and node k is considered downstream by node 1). A node i considers a neighbor j to be downstream based on comparison of its stored values for the respective heights, $H_i$ and $HN_{i,j}$. This is not possible if any of the corresponding entries in the height arrays ($HN_{i,j}|(i, j)$ is part of the loop) are NULL, since a neighbor with a height of NULL is never considered downstream. A non-NULL height array entry for a neighbor j, implies prior reception of an UPD packet from that neighbor, which by the initial assumptions implies $HN_{i,j}=H_j$ for all i=1 to k and $j \in N_i|(i, j)$ is part of the loop. Furthermore, the height of all nodes that are part of loop must be non-NULL. Therefore, the internal node comparisons which define the downstream links, $HN_{2,1}<H_2$, $HN_{3,2}<H_3$, . . . $HN_{k, k-1}<H_k$, $HN_{1,k}<H_1$, can be rewritten $H_1<H_2<H_3$ . . . $<H_{k-1}<H_k<H_1$. This is a clear contradiction, since the heights are quintuples where the last value is the unique ID of the node (ensuring that they can be totally ordered lexicographically).

It would be comforting to show analytically that there is a finite bound on TORA's worst-case convergence time. However, this is not always true for the current specification of the protocol, i.e., in some circumstances the protocol can enter a cycle, or potential oscillation which theoretically could repeat indefinitely. The protocol is kept in this cycle, not by continuously occurring topological changes but by continuously occurring QRY packets being generated and transmitted by nodes at inopportune times, essentially building "invalid" routes rooted at nodes other than the destination.

In the absence of building new routes, the protocol (as specified) will converge within a finite time. Furthermore, that the creating routes process can be modified such that a finite bound on the worst-case convergence time can be established even in the presence of route building. However, it is not clear that doing so is desirable. Every mechanism that has been devised to accomplish this task would negatively impact the protocol's communication complexity so much as to make the "cure worse than the disease." Furthermore, the potential oscillatory behavior is highly dependent on the physical topology of the network, the state of the nodes at the time of the last topological change and the timing of the packet transmissions. Thus, it is unlikely that any oscillations will persist long. In essence, TORA is biased towards convergence. For the protocol to remain in the cycle requires an infinite sequence of near-perfectly timed QRY generations (something which would be highly unlikely). Any deviation from such a sequence would result in protocol convergence. Conceptually, this can be viewed as requiring omniscient active control to prevent protocol convergence-implying that TORA is inherently stable.

The results of a simulation study show that despite its unbounded worst-case convergence time, the invention performs well under a wide variety of networking environments, and never displays the traditional explosion of control or data message traffic that hallmarks protocol instability when routing tables become scrambled. Through approximately 150 hours of simulated runtime under rather extreme and stressing scenarios, TORA's average performance remains consistently good (i.e., comparable or better than an ideal link-state (ILS) algorithm). The amount of control overhead generated by TORA is less than that of ILS for every data point of every bandwidth utilization plot ever run.

One explanation for why the invention performs well, despite its unbounded worst-case convergence time, relates to the notion of internodal coordination, a technique used in distance-vector routing algorithms to prevent the "counting-to-infinity" problem. In a distance-vector routing algorithm, nodes maintain (and exchange) estimates of their distance to the given destination. In a sense, this distance metric serves as a protocol's "anchor" to the destination and ensures global "stability." The counting-to-infinity problem can occur when nodes update their distance metrics based on a node with outdated information. With this conceptual view, it is apparent that the counting-to-infinity problem exhibited by some distance-vector algorithms is related to the unstable behaviors exhibited by the invention. By coordinating topological change reactions with surrounding nodes under certain circumstances, the counting to infinity problem can be prevented in distance-vector routing.

Although the technique is vastly different, TORA also uses a form of internodal coordination. Upon failure of the last downstream link, a node generates a new reference level. The set of affected nodes propagate the reference level, essentially coordinating a structured reaction to the failure. In a sense, the set of nodes that propagate the reference level becomes "anchored" to the node that generated the reference level. Within an "unstable" section of the network (i.e., one where there are ongoing failure reactions anchored to different nodes), the coordinated group of nodes anchored to the node that generated the highest reference level will typically dominate (i.e., expand to include more nodes) until either all groups merge with it (and it joins a "stable" section of the network) or it detects a partition. If a partition is detected, all the nodes with that reference level will be set to NULL. Thus, this coordination of nodes with a common reference level has a stabilizing effect within the protocol, significantly reducing the likelihood of an excessively long convergence time.

As mentioned earlier, the "potential" for oscillatory behavior stems from the fact that routes are built on-demand, and that the height metric used in TORA is not firmly anchored to the destination. Thus, there is a potential for oscillations to occur when multiple sets of coordinating nodes are simultaneously detecting partitions, erasing routes, and building new routes based on each other. However, permitting this potential, something which would be forbidden in a traditional approach to protocol design, and then biasing the invention away from oscillation is exactly what allows localization of TORA's communication, making it highly-adaptive and well-suited for a dynamic bandwidth-constrained networking environment.

Since the protocol is designed to decouple (to the greatest extent possible) the generation of far-reaching control message propagation from the dynamics of the network topology, there is no explicit distance estimate or link-state information propagation. However, when the DAG is initially formed upon route creation (i.e., before any subsequent link reversals), the fourth element of each node's height $\delta_i$ essentially contains the distance in hops from the destination over the path traveled by the UPD packet to the node, recall FIG. 3(f). This distance information can be used, if desired, to favor routing over links with shorter distances; although, under heavy traffic conditions, this may not be appropriate due to the congestion-enhancing effect of single-path routing. As links are reversed in reaction to a failure, this distance information is lost in these "reversed" network portions (as $\delta_i$ no longer denotes distance to the destination when the reference level is not zero). Thus, over time, as the link reversal process proceeds, the destination-oriented DAG may become less optimally directed than it was upon creation.

A possible enhancement to the protocol would be to periodically propagate optimization packets outwards from the destination, reception of which resets the reference level of all nodes to zero and restores distance significance to their $\delta_i$'s. In addition to serving as a routing enhancement, the optimization process guarantees that router state errors, resulting from undetectable errors in packet transmissions or other sources, do not persist for arbitrary lengths of time. Any router state which is not explicitly refreshed by the optimization process will eventually time-out and be deleted (i.e., returned to a NULL value). Thus, the periodic optimization also serves as soft-state confirmation of route validity. This optimization/refresh process permits introduction of far-reaching control message propagation as a secondary, background mechanism that is independent of network topology dynamics. Although the overhead associated with this optimization mechanism grows proportionally to the square of the number of nodes, the periodic interval is controllable. Ideally, this procedure should occur at a very low rate, to minimize the impact of the added overhead.

A simulation study was conducted to evaluate the relative performance of TORA and ILS routing. The simulations were designed to provide insight into the effect of varying network size, average rate of topological changes and average network connectivity. While the average network connectivity was found not to be a significant factor, the relative performance of TORA and ILS was found to be critically dependent on the network size and average rate of topological changes. The results indicate that for a given available bandwidth, as either the size of network increases or the rate of network topological change increases, the performance of TORA eventually exceeds that of ILS. Specifically, as the network size and/or rate of topological change increases, the amount of control overhead for ILS increases much more rapidly than for TORA, effectively congesting the communication channel and causing additional queuing delay for message traffic. Therefore, above some combination threshold of network size and rate of topological change, TORA provides lower end-to-end message packet delay on average for a given available bandwidth.

The point to be emphasized is that under some networking conditions TORA, which is not a shortest-path routing algorithm, can outperform a shortest-path routing algorithm. ILS is but one approach for performing shortest-path routing. Nevertheless, for a given network size and rate of topological change, any shortest-path algorithm requires a minimum amount of control overhead to permit continuous computation of the shortest-path. We conjecture that as the network size and/or rate of topological change are increased, this minimum amount of control overhead to permit computation of the shortest-path will increase more rapidly than the amount of control overhead for TORA.

For example, the flow charts of FIGS. 7–16 illustrate one example of a specification of an algorithm implementing the method of the present invention. Specific variables of these flow charts are defined in Table 1. This example can also be used to implement a system according to the invention.

TABLE 1

| Data Structures: | | |
|---|---|---|
| Height | | Data structure used to store the quintuple referred to as the height of a node. |
| .tau | double | The time the reference level was created. |
| .oid | interger | The unique id of the node that created the reference level. |
| .r | boolean | Flag indicating if it is a reflected reference level (0.1). |
| .delta | integer | Metric used in propagation of a reference level. |
| .id | integer | The unique id of the node (guarantees total ordering). |
| Predefined Values: | | |
| NULL | Height | An unknown or undefined height. (Can be thought of as an infinite height.) |
| ZERO | Height | The assumed height of the destination. Height.tau = 0.0 Height.oid = 0 Height.r = 0 Height.delta = 0 Height.id = the unique id of the destination |
| State Variables: | | |
| H | Height | The height of this node. |
| RR | boolean | Flag indicating if a route is required (NO, YES). |

TABLE 1-continued

| | | |
|---|---|---|
| TU | double | The time at which an UPD packet was last sent by this node. |

For each active link "k" (i.e. a logical link that supports full duplex communication connecting to an adjacent node), maintain the following variables.

| | | |
|---|---|---|
| HN[k] | Height | The height of the adjacent connected via link "k." |
| LS[k] | enumeration | The assigned state of link "k" (UN, UP, DN). |
| TA[k] | double | The time at which the link "k" became active. |

Auxiliary Variables:

| | | |
|---|---|---|
| num_active | integer | The number of active adjacent links. |
| num_down | integer | The number of links marked DN in the LS array. |
| num_up | integer | The number of links marked UP in the LS array. |
| rr_temp | boolean | Temporary variable used to store value of RR (NO, YES). |
| tau_temp | integer | Temporary variable used to store value of Height.tau. |
| oid_temp | integer | Temporary variable used to store value of Height.oid. |

Functions:

| | |
|---|---|
| update_LS( ); | For each active link "k." update LS[k] in accordance with the following rules.<br>if　　　　HN[k] == NULL　　　then　LS[k] = UN;<br>else if　　H == NULL　　　　　then　LS[k] = DN;<br>else if　　HN[k] < H　　　　　　then　LS[k] = DN;<br>else if　　HN[k] > H　　　　　　then　LS[k] = UP;<br>In the above equations, heights are compared lexicographically. |
| send_qry( ); | Broadcast a QRY packet to the set of adjacent nodes. |
| send_upd( ); | Broadcast a UPD packet to the set of adjacent nodes. |
| send_clr( ); | Broadcast a CLR packet to the set of adjacent nodes. |

Figure 7:
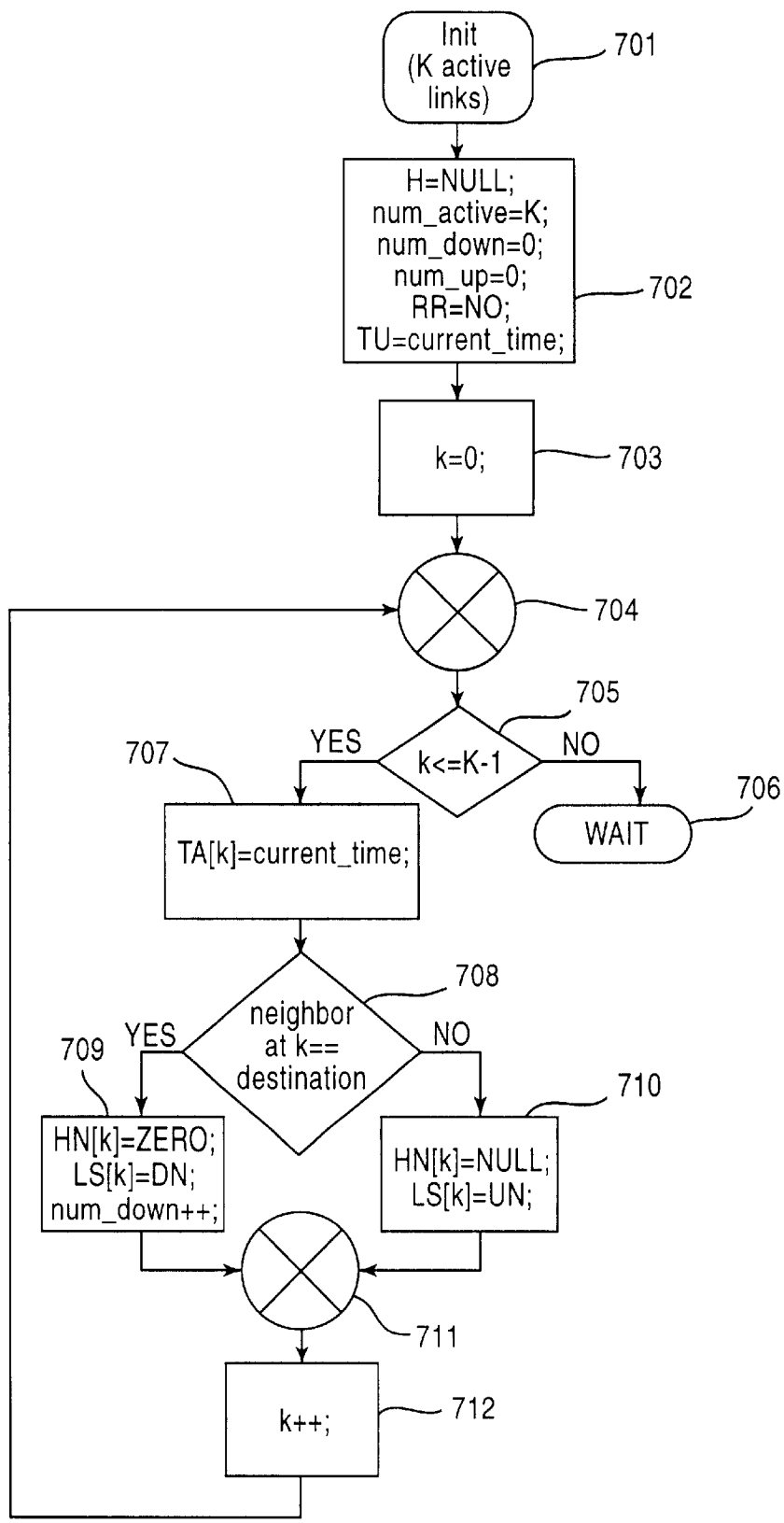

In FIG. 7, the process is started in step 701 and the initial values of variables are set in step 702. The variable k is set to zero, in step 703. Thereafter, in 704, when k is greater than K−1, step 705, the process is held, step 706, and when k is less than or equal to K−1, the time at which link "k" became active is set to the current_time, in step 707. In step 708, it is determined whether a neighbor at k is the destination and if it is then the height of the adjacent connected via link k is set to zero and the assigned state of link k is set to DN and the num_down is incremented, in step 709. If a neighbor at k is not the destination, the adjacent height is set to NULL and the state is set to UN, in step 710. Thereafter, 711, the k value is incremented, step 712, and the process is begun again.

Figure 8:
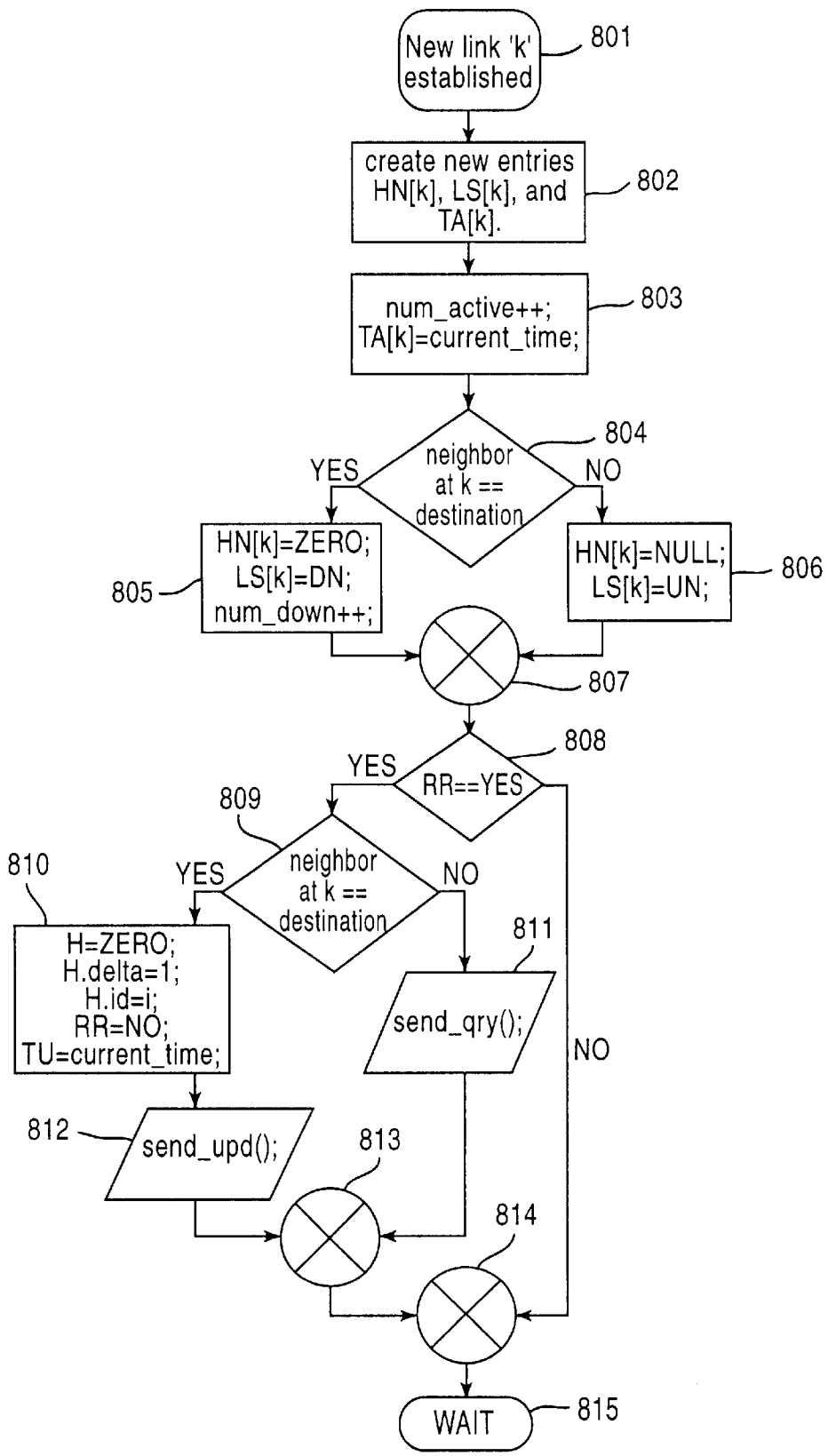

In FIG. 8, a new link is established in step 801, new entries are created in step 802 and values are set in step 803. It is determined whether a neighbor at k is the destination, 804, and a process similar to that in steps 709 and 710 is carried out. Thereafter, 807, it is determined whether the route flag is set to YES, 808, and if it is not, then the process stopped, 814, 815. If the route flag is set to YES, it is determined whether a neighbor at k is the destination, 809. If not, then a QRY packet is broadcast to adjacent nodes, 811, or values are set, step 810, and a UPD packet is broadcast to adjacent nodes, in step 812.

Figure 9:
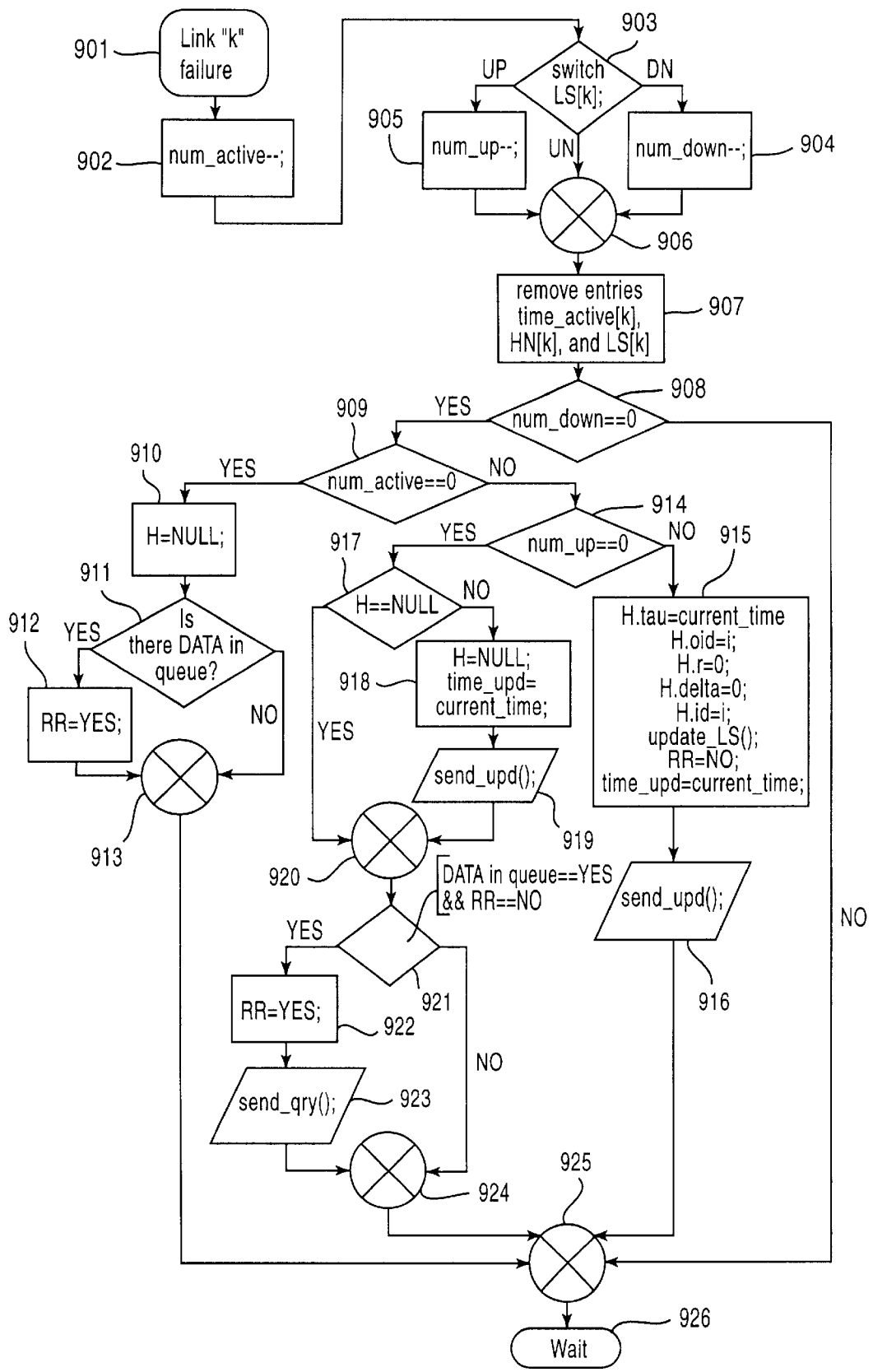
Figure 10:
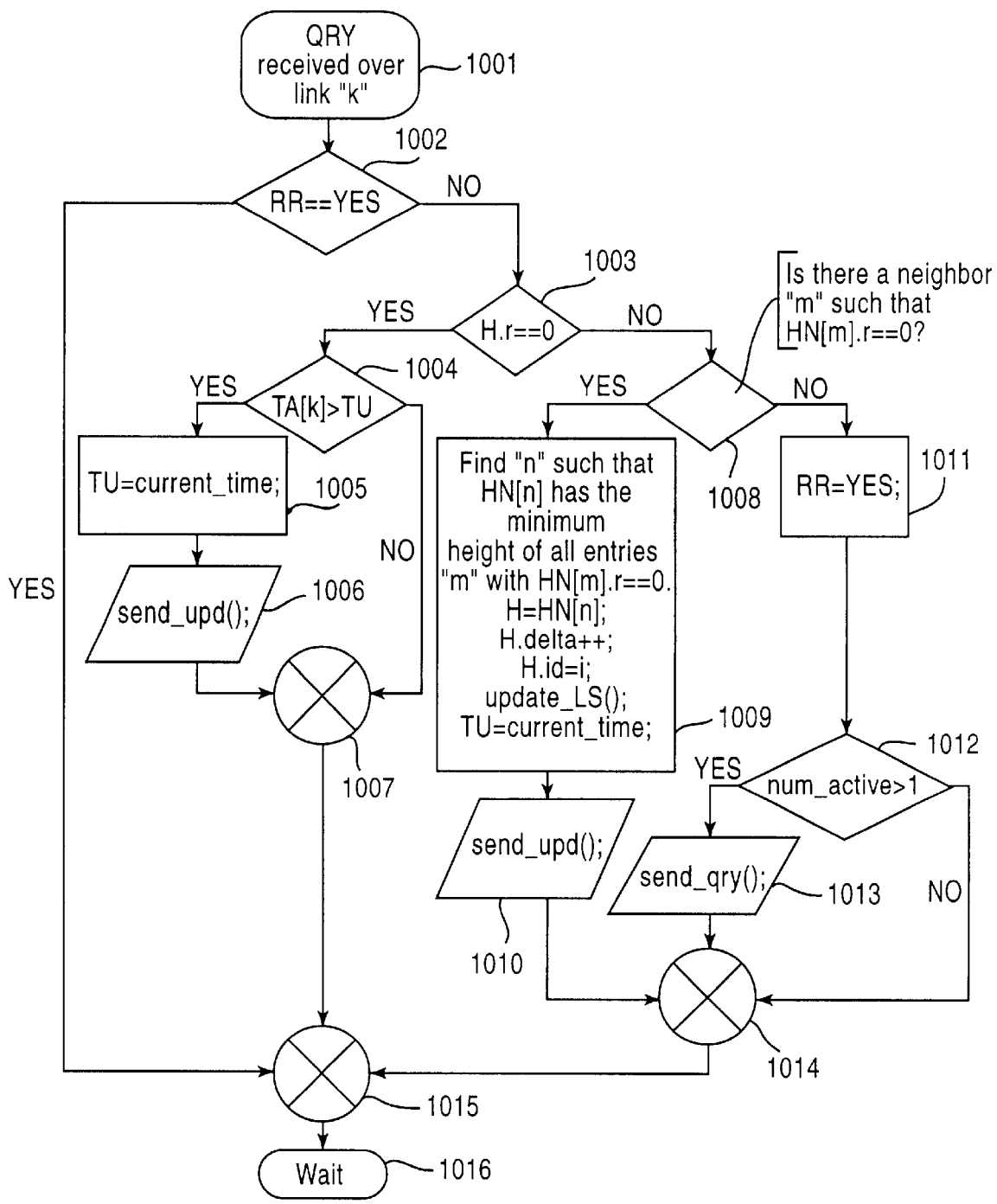

FIG. 9, deals with a failure of link "k", in step 901, and the num-active is decremented, in step 902. Next it is determined what should happen to the assigned state of the link k, with steps 904, 905 and 906 being the possible results. Entries are removed, in step 907, and the num_down, num_active and num_up are examined to determined whether they are zero, steps 908, 909 and 914. Based on those determinations, values may be set and other determinations may be made, steps 910–913 and 915–926. In FIG. 10, a QRY is received over link "k", step 1001, and it is determined whether the route is required, step 1002. When is determined whether the route is required, step 1002. When reflected reference height is equal to zero, step 1003, the active time is determined, step 1004, values are set, 1005 and a UPD packet is broadcast, step 1006–1015. If the reflected reference height is not equal to zero, then additional determinations are made, steps 1008 and 1012, values are set, steps 1009 and 1011, and packets may be sent to adjacent nodes, steps 1010 and 1013–1016.

Figure 11B:
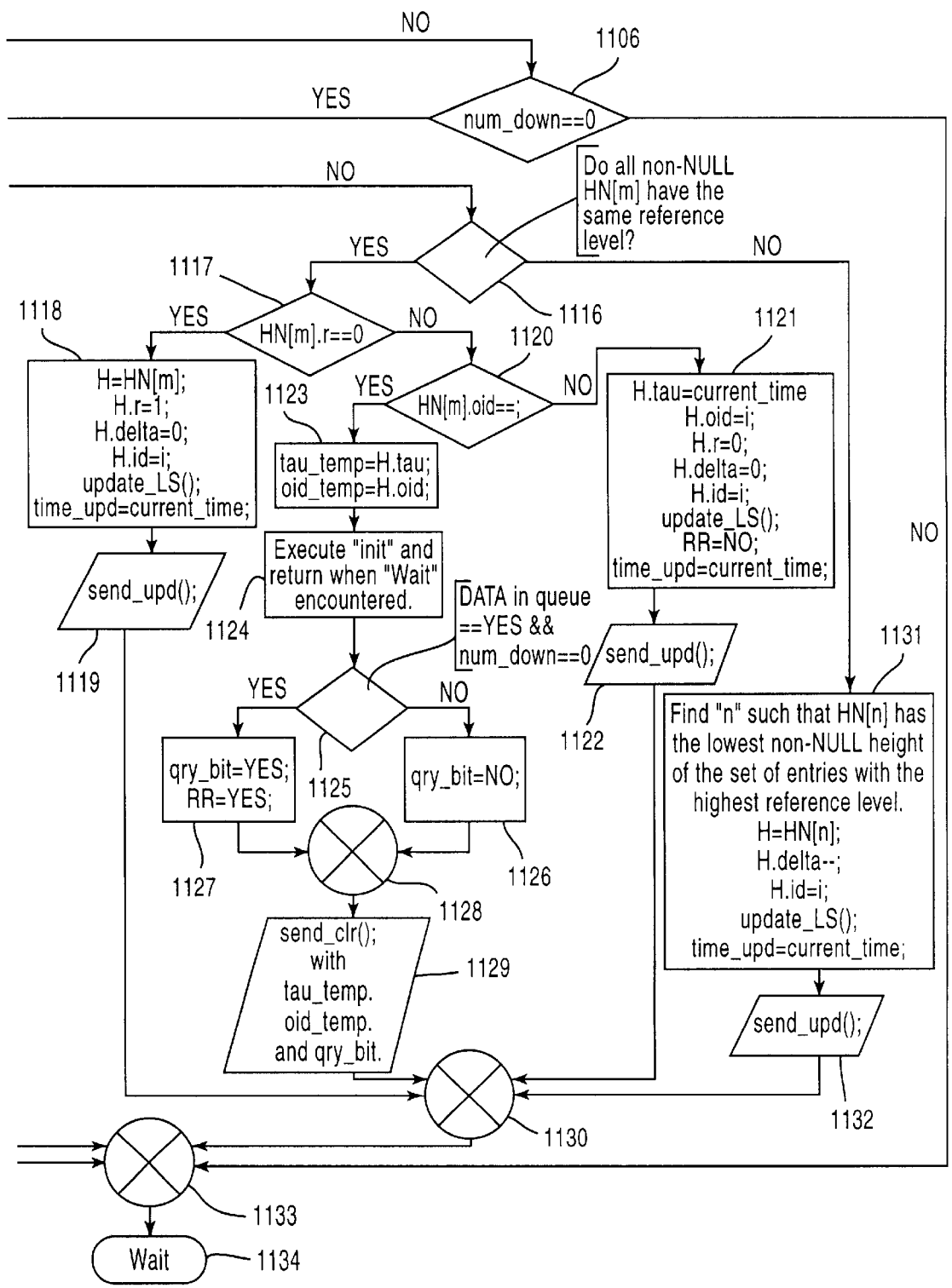
Figure 12:
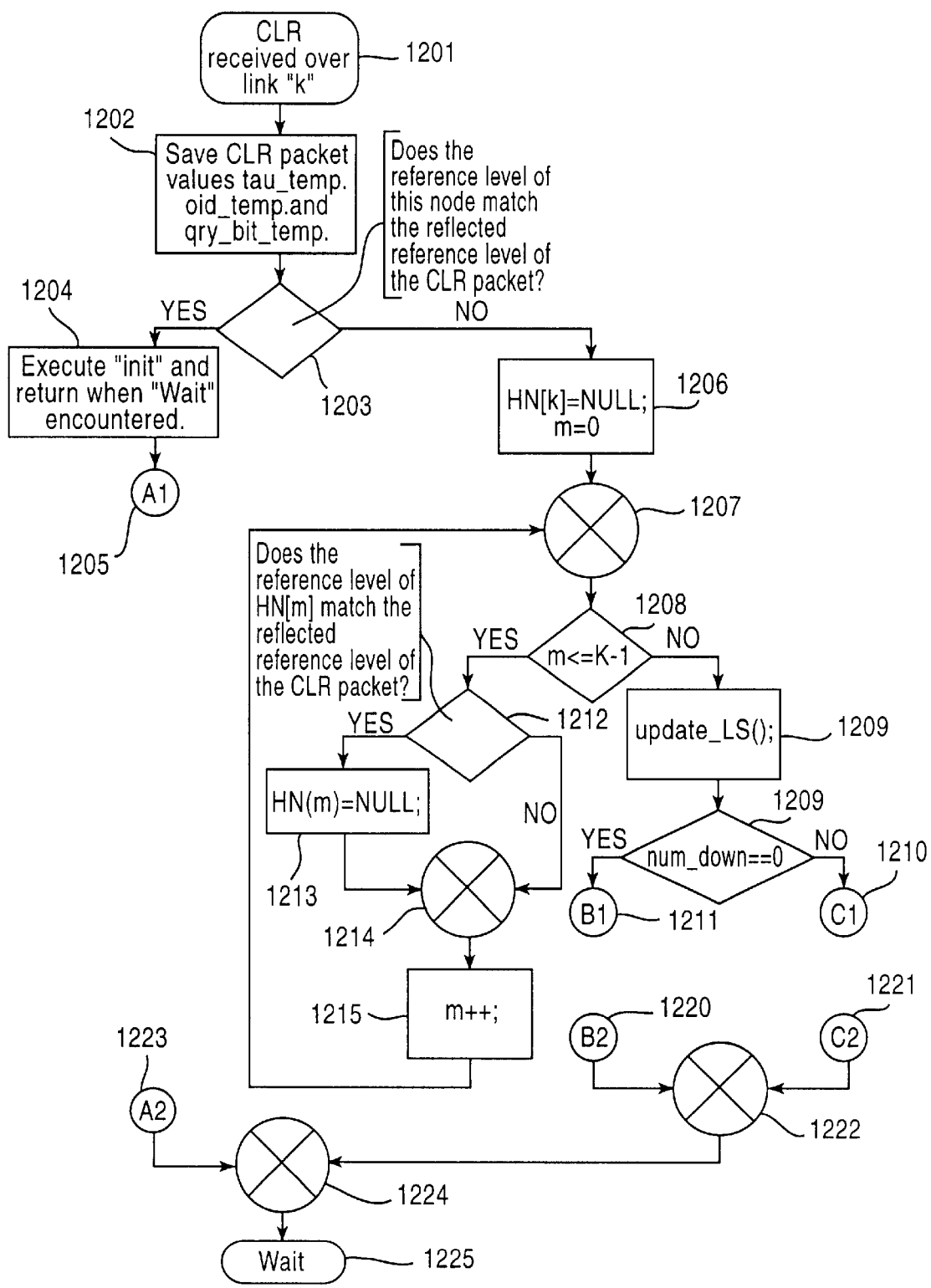

In FIG. 11, including FIGS. 11A and 11B, the code is conducted when the UPD is received over a link "k", in step 1101. Based on determinations illustrated in FIG. 11, steps 1103, 1106, 1107, 1108, 1112, 1116, 1117, 1120, 1125, different values are set, steps, 1102, 1104, 1109, 1113, 1118, 1121, 1123, 1124, 1127, 1126 and 1131, and packets may be broadcast to adjacent nodes, steps 1105, 1110, 1114, 1119, 1122, 1129–1134. In FIG. 12, the code is conducted when the UPD is received over a link "k", in step 1201. Based on determinations illustrated in FIG. 12, steps 1203, 1208, 1212, 1209, and different values are set, in steps, 1202, 1204, 1206, 1209, 1213 and 1215. Based on the determinations, the process may branch off to A1, B1, or C1, steps 1205, 1211 and 1210, with the returns from those processes, A2, B2 and C2, steps 1220–1225, are also illustrated in FIG. 12.

Figure 13:
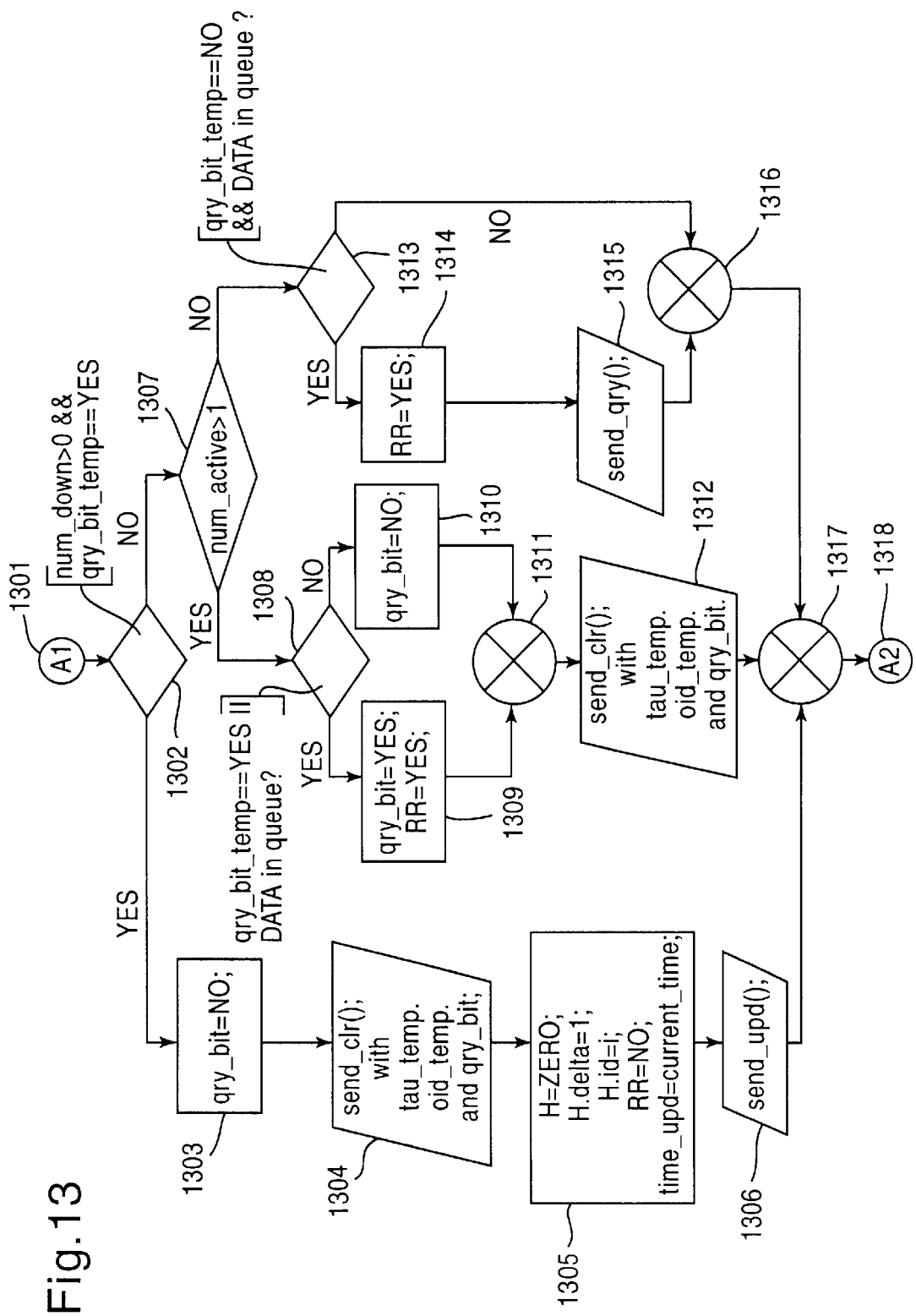
Figure 14:
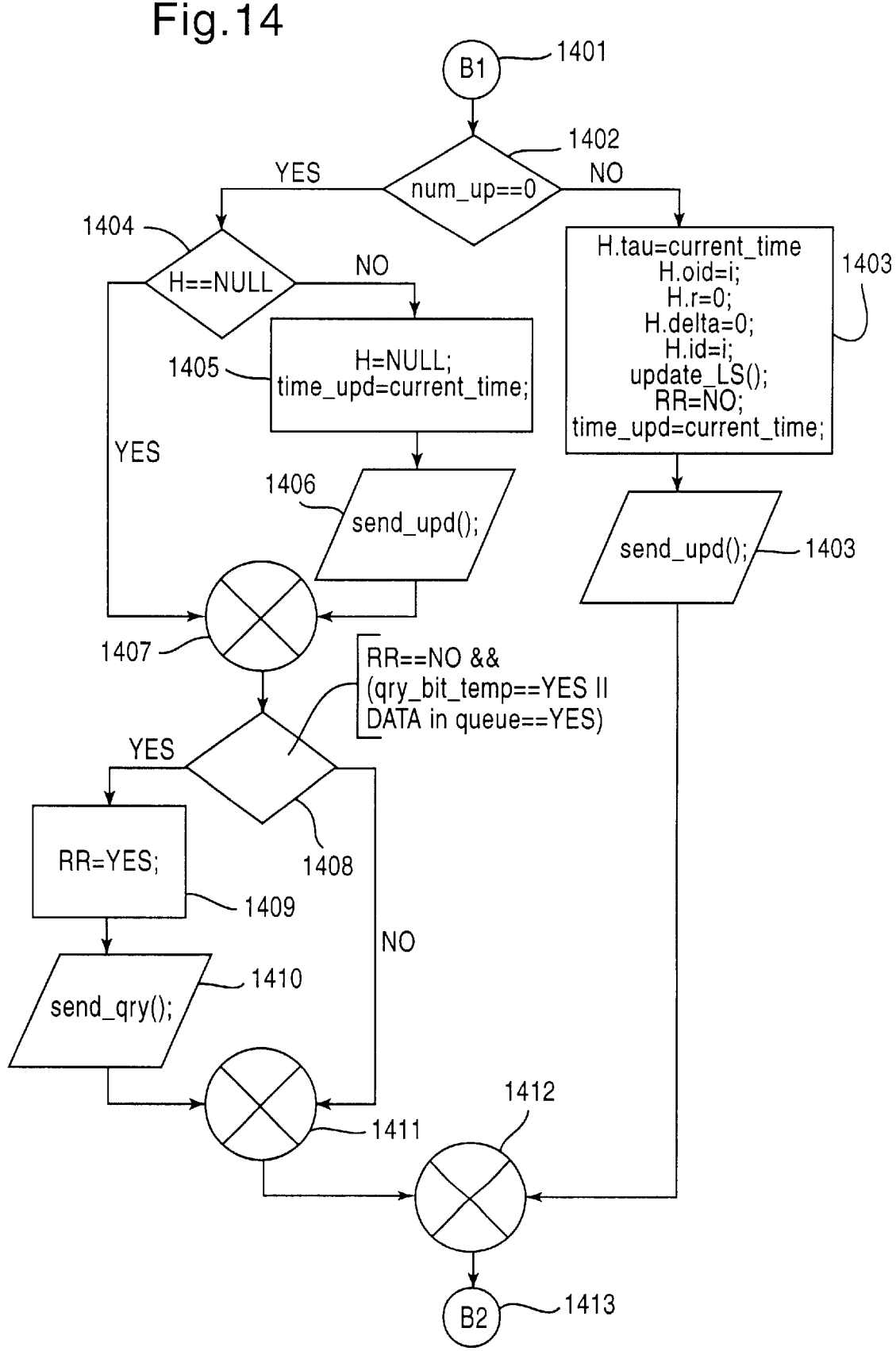
Figure 15:
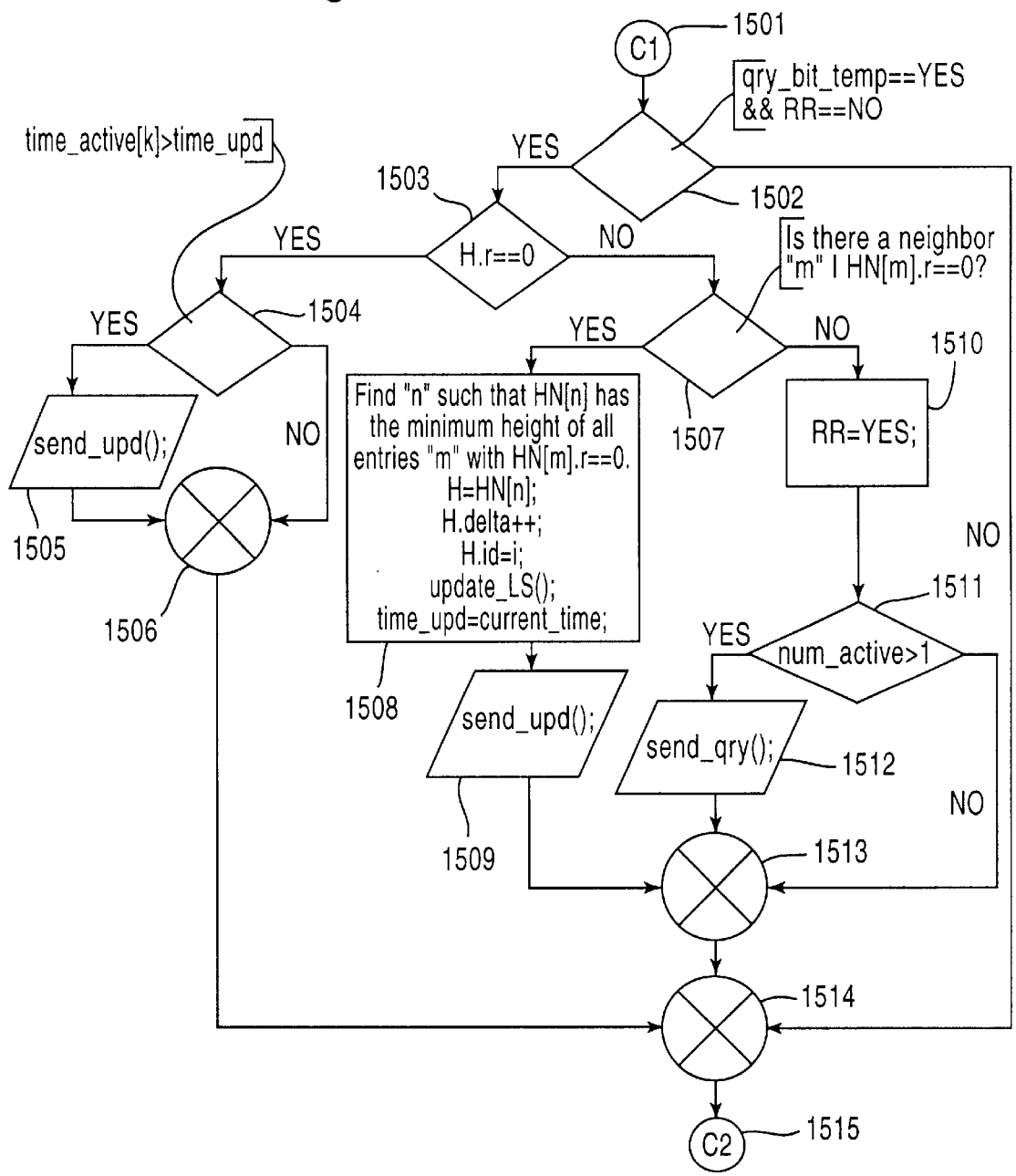

The sub-process A1, step 1301, is illustrated in FIG. 13, with determinations made in steps 1302, 1307, 1308 and 1313, values set in steps 1303, 1305, 1309, 1310 and 1314, and packets sent in steps 1304, 1306, 1312 and 1315, with the process returning to A2, 1318, through steps 1316 and 1317. The sub-process B1, step 1401, is illustrated in FIG. 14, with determinations made in steps 1402, 1404 and 1408, values set in steps 1403, 1405 and 1409, and packets sent in steps 1403, 1406 and 1410, with the process returning to B2, 1413, through steps 1411 and 1412. The sub-process C1, step 1501, is illustrated in FIG. 15, with determinations made in steps 1502, 1503, 1504, 1507 and 1511, values set in steps 1508 and 1510, and packets sent in steps 1505, 1509 and 1512, with the process returning to c2, 1515, through steps 1506, 1513 and 1514.

In FIG. 16, data is received, in step 1601, and it is determined whether the data is received from an upper layer or a neighbor, in step 1602. If the next-hop address of the packet a valid address for this node, in step 1603, data is sent, step 1605–1606. When the data is received from an upper layer, the numdown is examined to determine if it is equal to zero, in step 1604. If it is not, then the data is sent, as discussed above. If not, then values are set and further determinations are made, 1607–1610, and a QRY packet may be sent, in step 1611, and the process is ended, steps 1612–1614.

The foregoing description of the present invention discusses and illustrates an algorithm for routing in a dynamic bandwidth constrained network. A person of ordinary skill in the art would understand that this algorithm could be applied to other types of networks, where routes must be created, maintained, and erased. This algorithm is well suited for large, bandwidth-constrained networks such as mobile, multihop, wireless networks. The invention typically requires only a single pass of the distributed algorithm in order to react to link failures, and minimizes communication overhead while maximizing efficiency.

The above description of the invention is intended for illustrative purposes only. Numerous modifications can be made to the disclosed configuration, while still remaining within the scope of the invention. For a determination of the metes and bounds of the invention, reference should be made to the appended claims.

What is claimed is:

1. A routing method for a dynamic network, said method comprising the steps of:

providing a dynamic network having a plurality of nodes;

initiating a query request as a first route request from a first node, requesting a communication route to a second node;

propagating the query request to a plurality of neighboring nodes, said query request including a query of whether or not each neighboring node has a direct link to the second node;

further propagating the query request through the network, in search of a third node having a direct link to the second node, wherein said query request continuously persists until a reply is received from the third node, the reply propagating through the network, thereby forming the communication route and voiding the propagated query request; and maintaining the communication route between the first node and the second node, thereby enabling communication therebetween, said communication route comprising nodes having downstream links;

wherein the initiating, propagating, further propagating and maintaining steps are performed using a height value set for each node of the plurality of nodes.

2. A routing method as recited in claim 1, wherein said step of further propagating the query request includes a step of detecting, when no reply is received from the third node, when new neighboring nodes exist due to the creation of new links, and wherein the query request is propagated to the new neighboring nodes, said query request continuously persisting until a reply is received from the third node.

3. A method as recited in claim 1, wherein said step of propagating the query request through the network comprises a step of setting a route request flag in each node of the plurality of neighboring nodes.

4. A method as recited in claim 3, wherein the reply signal from the third node unsets the route request flags in a reverse propagation through the network.

5. A method as recited in claim 1, further comprising the steps of:

setting the height value for each node in communication route between the first node and the second node;

determining if a node in the communication link loses a last downstream link;

determining if the link was lost due to failure in the network;

if the link was lost due to the failure in the network, generating a new height value for the node, said height value including a reference level;

propagating the reference level through a portion of the network;

said propagation continuing until a new communication route is established or until a partition is detected.

6. A method as recited in claim 5, wherein said method further comprises the step of:

determining a network partition when no communication route is established and signaling the partition to avoid invalid routing of messages.

7. A method as recited in claim 6, wherein the signaling of the partition includes erasing all invalid routes by setting the height values to NULL.

8. A method as recited in claim 5, wherein said step of generating a new height value for the node includes a step of basing the new height value upon a temporal order of events, wherein the propagation of the new reference level through the portion of the network includes assignment of new height values to at least one node in the new communication route, said new height values each including a relative temporal component.

9. A method as recited in claim 5, wherein said step of propagating the new reference level through the portion of the network comprises a step of reversing links to establish the new communication route in a single pass.

10. A method as recited in claim 9, wherein said step of reversing links includes a step of transmitting a reflection bit from a dead end node, thereby reversing a propagation direction.

11. A method as recited in claim 5, wherein the step of setting the height value for each node includes setting the height value as a quintuple value.

12. A system for routing in a dynamic network, the dynamic network including a plurality of nodes, said system comprising:

initiating means for initiating a query request as a first route request from a first node, said initiating means requesting a communication route to a second node;

propagating means for propagating the query request to a plurality of neighboring nodes, said query request including a query of whether or not each neighboring node has a direct link to the second node;

continuous propagating means for further propagating the query request through the network, in search of a third node having a direct link to the record second node, wherein said query request continuously persists until a reply is received from the third node, said third node propagating the reply through the network, thereby forming the communication route and voiding the propagated query request; and maintaining means for maintaining the communication route between the first node and the second node, thereby enabling communication therebetween, said communication route comprising nodes having downstream links;

wherein the initiating, propagating, further propagating and maintaining means are configured to perform their respective functions using a height value set for each node of the plurality of nodes.

13. A system as recited in claim 12, wherein said continuous propagating means detects, when no reply is received from the third node, when new neighboring nodes exist due to the creation of new lengths, and wherein the query request is propagated to the new neighboring nodes, said query request continuously persisting until a reply is received from the third node.

14. A system as recited in claim 12, wherein said propagating means includes route request flag setting means to set a route request flag in each node of the plurality of neighboring nodes.

15. A system as recited in claim 12, said system further comprising:
   height value setting means for setting a the height value for each node in the communication route between the first node and the second node;
   determining means for determining if a node in the communication route loses a last downstream link, said determining means for determining if the link was lost due to failure in the network;
   generating means for generating a new height value for the node if the link was lost due to the failure in the network, said new height value including a reference level;
   propagating means for propagating the reference level through a portion of the network, said propagation means continuing said propagation until a new communication route is established or until a partition is detected.

16. A system as recited in claim 15, said system further comprising:
   network partition determining means for determining a network partition when no communication route is established, said network partition determining means generating a signal indicating the partition, thereby avoiding invalid routing of messages, said network partition determining means issuing a CLEAR signal which erases all invalid routes by setting height values in invalid routes to NULL.

17. A system as recited in claim 15, wherein said generating means generates the new height value based upon a relative temporal component related to the node, and wherein the propagating means propagates the new reference level through a portion of the network after assigning new height values to at least one node in the new communication route, said new height values each including a relative temporal component.

18. A system as recited in claim 17, wherein the node losing the last downstream link has a height value which is higher than all other nodes in the network.

19. A system as recited in claim 15, wherein the propagating means propagates the reference level onto the network by reversing links to establish the new communication route in a single pass.

20. A system as recited in claim 19, wherein said propagating means transmits a reflection bit from a dead end node, thereby reversing propagation direction.

21. A system as recited in claim 15, wherein the height value setting means sets height values as quintuple values.

* * * * *